US009938833B2

(12) United States Patent
Cooper et al.

(10) Patent No.: US 9,938,833 B2
(45) Date of Patent: Apr. 10, 2018

(54) METHODS, SYSTEMS, AND DEVICES FOR DESIGNING AND MANUFACTURING FLANK MILLABLE COMPONENTS

(71) Applicant: Concepts NREC, LLC, White River Junction, VT (US)

(72) Inventors: Derek J. Cooper, Fairlee, VT (US); Alexander Plomp, Lebanon, NH (US); David Japikse, Woolwich, ME (US)

(73) Assignee: Concepts NREC, LLC, White River Junction, VT (US)

( * ) Notice: Subject to any disclaimer, the term of this patent is extended or adjusted under 35 U.S.C. 154(b) by 0 days.

(21) Appl. No.: 15/280,494

(22) Filed: Sep. 29, 2016

(65) Prior Publication Data

US 2017/0016332 A1    Jan. 19, 2017

Related U.S. Application Data

(62) Division of application No. 14/693,646, filed on Apr. 22, 2015, now Pat. No. 9,465,530.

(Continued)

(51) Int. Cl.
*B23C 3/18*    (2006.01)
*F01D 5/04*    (2006.01)
(Continued)

(52) U.S. Cl.
CPC ............... *F01D 5/048* (2013.01); *B23C 3/18* (2013.01); *F01D 5/147* (2013.01);
(Continued)

(58) Field of Classification Search
CPC ....... B23C 2215/44; B23C 3/18; F01D 5/147; G05B 19/4068; G05B 2219/35287; G05B 2219/37355; G06F 3/04842
See application file for complete search history.

(56) References Cited

U.S. PATENT DOCUMENTS

| 5,391,024 A | 2/1995 | Levine et al. |
| 6,062,819 A | 5/2000 | Langeneh et al. |

(Continued)

OTHER PUBLICATIONS

Chu et al. "Improved Tool Positioning in 5-Axis Flank Milling by Simultaneous Perturbation Stochastic Approximation" from "International Journal of Innovative Computing, Information and Control, vol. X, No. X, 2011" (hereinafter Chu).*

(Continued)

*Primary Examiner* — Yuhui R Pan
(74) *Attorney, Agent, or Firm* — Downs Rachlin Martin PLLC

(57) ABSTRACT

Methods, systems, and devices for designing and manufacturing flank millable components. In one embodiment, devices, systems, and methods for designing a flank millable component are provided, in which a user is notified when a component geometry option is selected that will result in the component not being flank millable. In another embodiment, the user is prevented from selecting a geometry option that would result in the component not being flank millable. In yet another embodiment, devices, systems, and methods are provided for manufacturing a component with a flank milling process, in which optimized machine instructions are determined that minimize milling machine motion.

12 Claims, 20 Drawing Sheets

Related U.S. Application Data

(60) Provisional application No. 61/982,609, filed on Apr. 22, 2014.

(51) Int. Cl.
| | | |
|---|---|---|
| *F01D 5/14* | (2006.01) | |
| *G06F 17/50* | (2006.01) | |
| *G06F 3/0484* | (2013.01) | |
| *G05B 19/4068* | (2006.01) | |

(52) U.S. Cl.
CPC ..... *G05B 19/4068* (2013.01); *G06F 3/04842* (2013.01); *G06F 17/50* (2013.01); *B23C 2215/44* (2013.01); *B23C 2220/04* (2013.01); *F05D 2230/10* (2013.01); *G05B 2219/35287* (2013.01); *G05B 2219/37355* (2013.01); *G06F 2217/12* (2013.01); *Y10T 409/303752* (2015.01); *Y10T 409/305656* (2015.01)

(56) References Cited

U.S. PATENT DOCUMENTS

| | | | |
|---|---|---|---|
| 6,108,662 | A | 8/2000 | Hoskins et al. |
| 6,120,171 | A | 9/2000 | Shaikh |
| 6,393,331 | B1 | 5/2002 | Chetta et al. |
| 6,491,482 | B1* | 12/2002 | Fenkl ............... B23C 3/00 29/889.7 |
| 2003/0120376 | A1 | 6/2003 | Shibata et al. |
| 2007/0038531 | A1 | 2/2007 | Lukis et al. |
| 2009/0104023 | A1* | 4/2009 | Favray ............... F01D 5/141 415/160 |
| 2009/0249623 | A1* | 10/2009 | Holze ............... B23C 3/18 29/889.7 |
| 2009/0304473 | A1* | 12/2009 | Holze ............... B23C 3/18 409/131 |
| 2012/0265331 | A1 | 10/2012 | Chu et al. |
| 2013/0101367 | A1 | 4/2013 | Mundt |
| 2013/0268244 | A1 | 10/2013 | Clark et al. |
| 2013/0302103 | A1 | 11/2013 | Sona |
| 2015/0301519 | A1 | 10/2015 | Cooper et al. |
| 2015/0361802 | A1* | 12/2015 | Yoshida ............... F01D 5/043 415/119 |

OTHER PUBLICATIONS

International Search Report and Written Opinion dated Jul. 24, 2014 in International Application No. PCT/US2013/067567.

Julien Chaves-Jacob et al, "Design for Manufacturing Applied to Turbomachine Components," The International Journal of Advanced Manufacturing Technology, vol. 57, No. 5-8, Apr. 13, 2011, pp. 453-463.

Yayun Zhou et al, "Flank Millable Blade Design for Centrifugal Compressors," MED 2009, 17th Mediterranean Conference on Control & Automation, IEEE, Jun. 24-26, 2009, pp. 646-650.

Gupta S K et al, "Systematic Approach to Analysing the Manufacturability of Machined Parts," Computer Aided Design, vol. 27, No. 5, pp. 323-342, 1995.

C. Castagnetti, E. Duc, P. Ray, "The Domain of Admissible Orientation Concept: A New Method for Five-Axis Tool Path Optimisation," Computer-Aided Design 40 (2008) 938-950.

T.J. Craft, "Finite Difference Schemes," 2010/2011, PowerPoint Presentation for the University of Manchester School of Aerospace and Civil Engineering, retrieved from: http://cfd.mace.manchester.ac.uk/twiki/pub/Main/TimCraftNotes_All_Access/cfd1-findiffs.pdf.

* cited by examiner

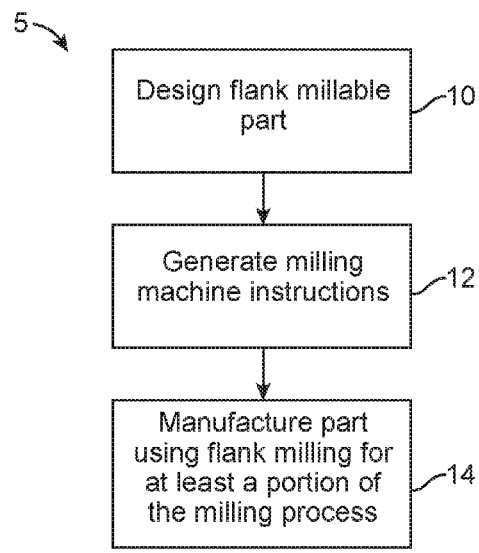
FIG. 1
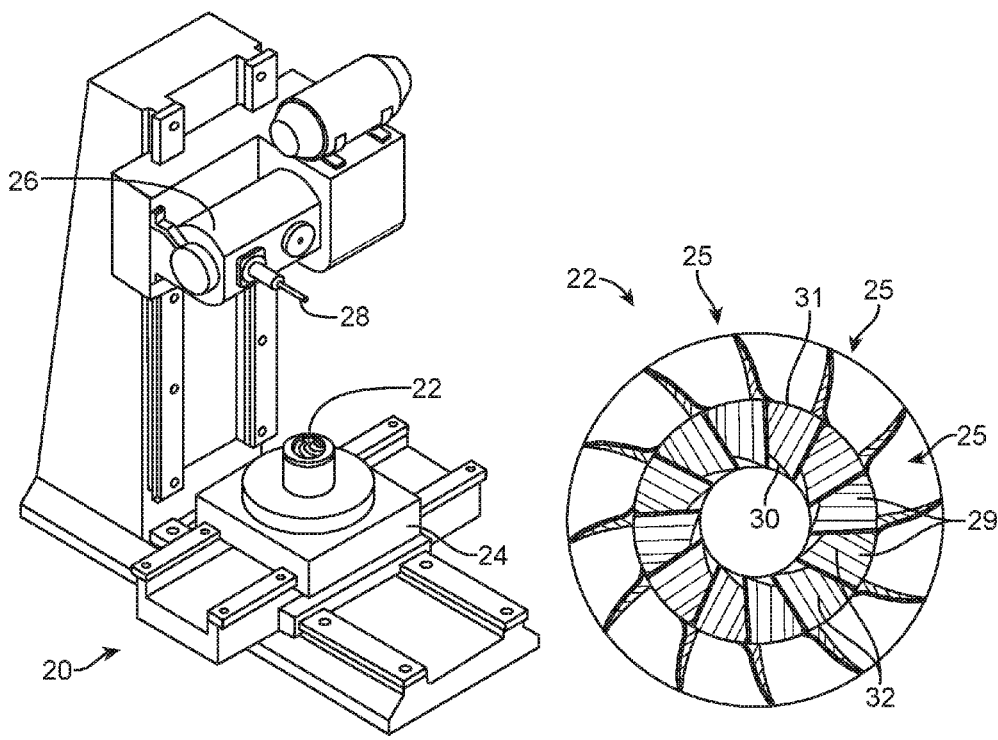
FIG. 2
FIG. 3

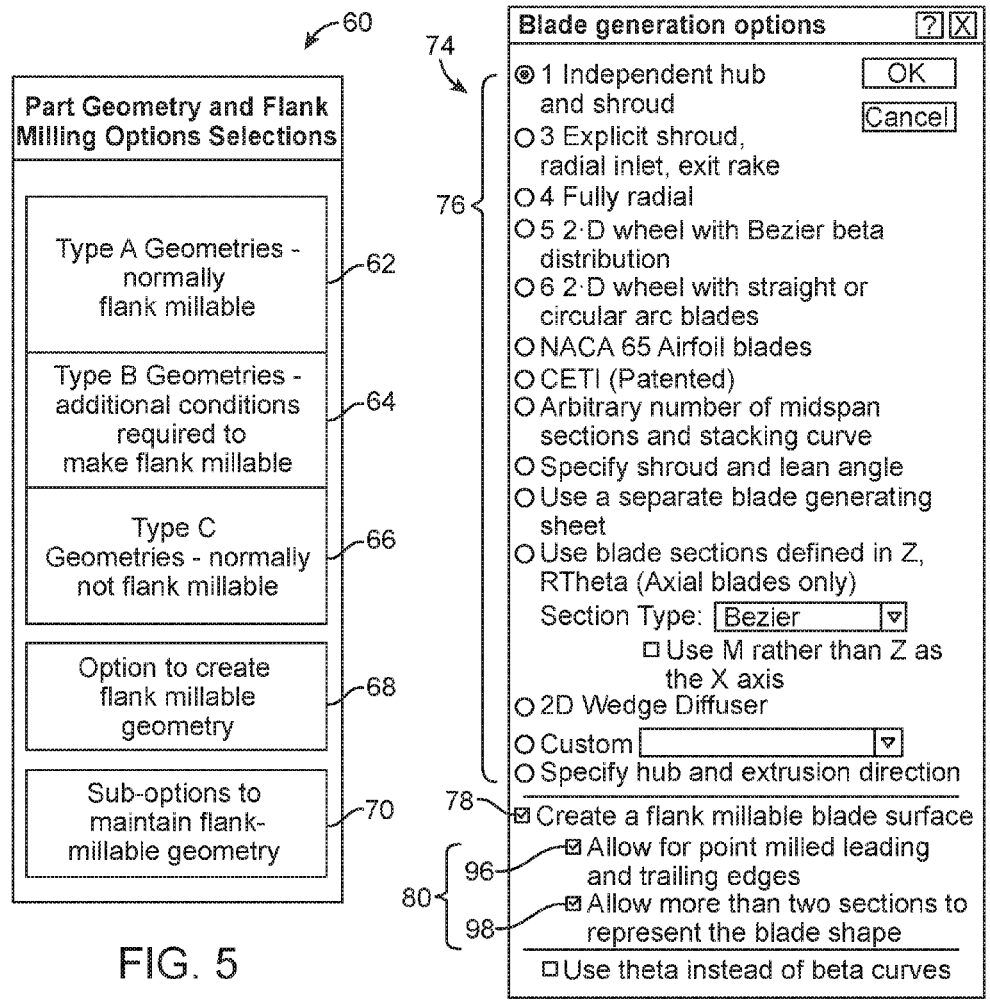
FIG. 5
FIG. 6
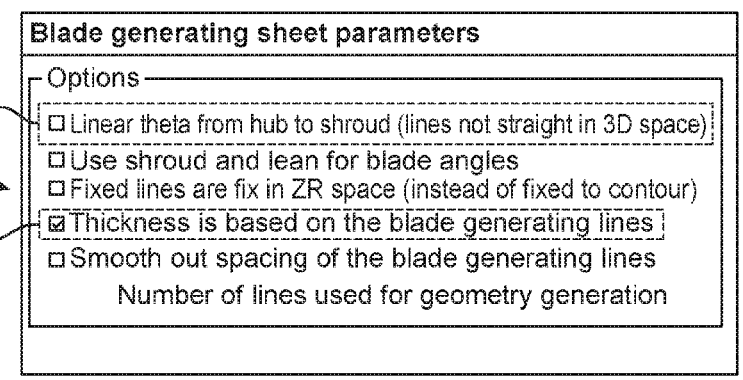
FIG. 9

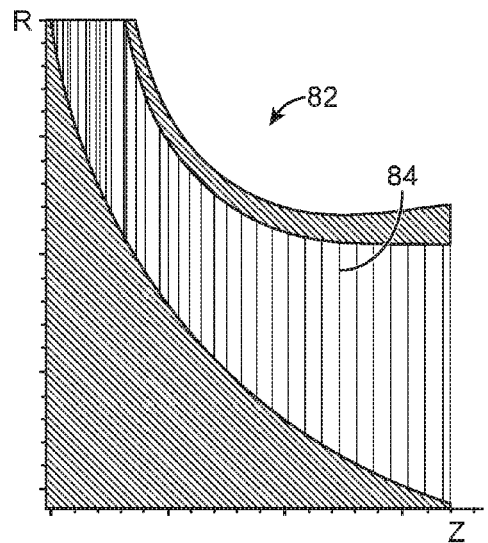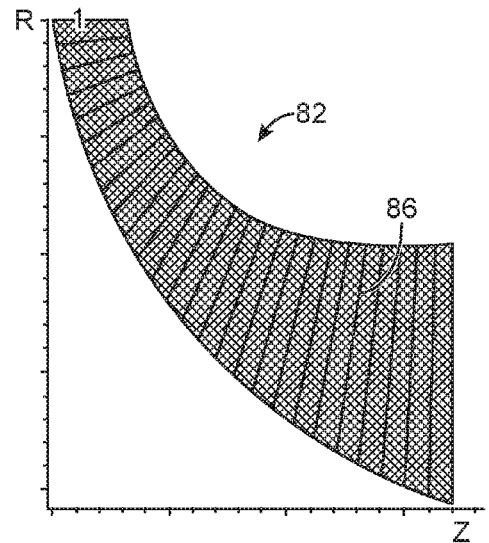
FIG. 7    FIG. 8
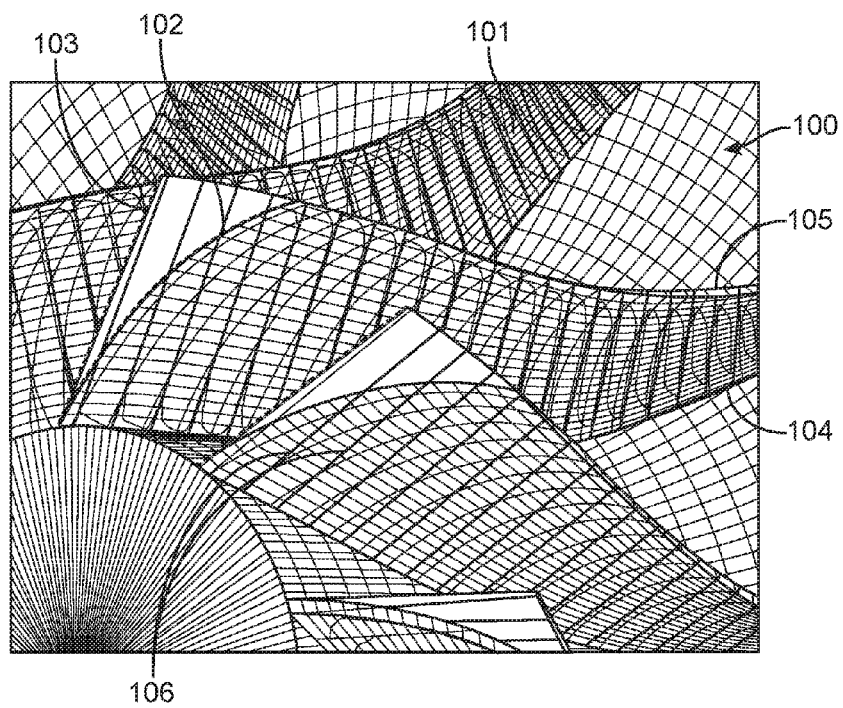
FIG. 10

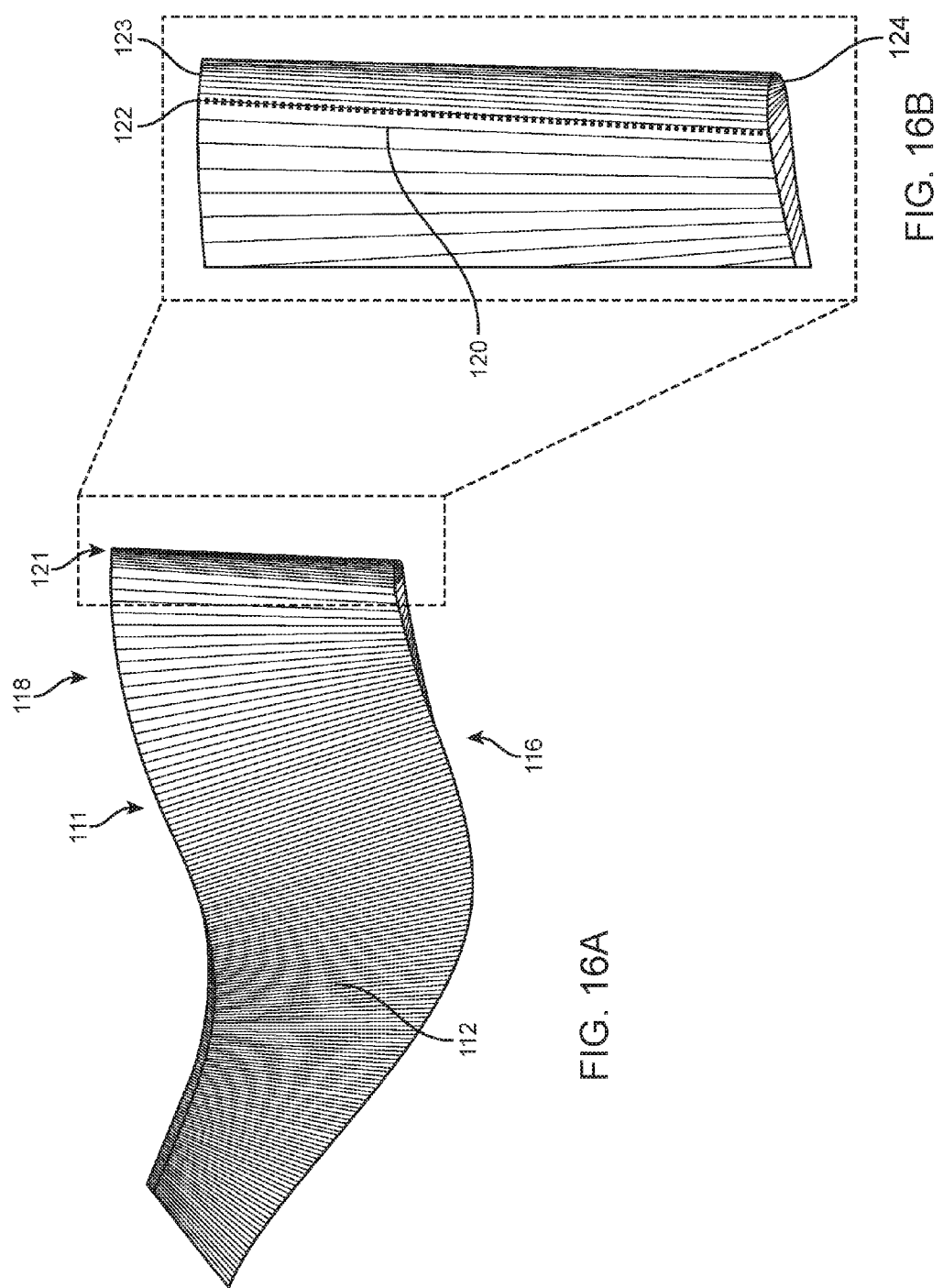

METHODS, SYSTEMS, AND DEVICES FOR DESIGNING AND MANUFACTURING FLANK MILLABLE COMPONENTS

RELATED APPLICATION DATA

This application is a divisional application of U.S. patent application Ser. No. 14/693,646, filed Apr. 22, 2015, entitled "Methods, Systems, and Devices For Designing and Manufacturing Flank Millable Components," now allowed, which application is a non-provisional of U.S. Provisional Patent Application Ser. No. 61/982,609, filed Apr. 22, 2014, entitled "Methods, Devices, and Systems for Flank Milling a Turbo-Machinery Component." Each of these applications is incorporated by reference herein in its entirety.

FIELD OF THE INVENTION

The present invention generally relates to the field of design and manufacture of turbomachinery components. In particular, the present invention is directed to the design of flank millable turbomachinery components and methods of determining milling instructions for flank milling turbomachinery components.

BACKGROUND

Turbomachinery components can be designed using computer automated design (CAD) software to generate a dataset representing the shape of the component. Computer automated manufacturing (CAM) software can then be used to translate the data set into a series of machining instructions for manufacturing the component.

Turbomachinery components are often manufactured by a machining process whereby material is removed from a work piece with a mill having a rotary cutter. Significant advancements in machining time, part tolerances, and part finishes have been realized by employing a flank milling process, where the side of an elongated cutter is used to remove material, rather than the end of the cutter, which is utilized in a point milling process. Flank milling, however, can only be used to machine certain geometries and state of the art turbomachinery components often have very complex shapes. In addition, modern CAD software provides designers with great flexibility for designing components, enabling complex design processes to optimize component geometry. This high degree of flexibility can lead to the design of a component that will be difficult or impossible to flank mill. The designer, however, may not realize he or she has designed a component that cannot be flank milled until very late in the design process, for example, not until prototyping or manufacturing. At that point the designer is in an undesirable position choosing between proceeding with a less efficient and more costly manufacturing process such as point milling, or going back and re-designing the component. And even if a flank millable geometry is input into the CAM software, the machine instructions calculated by the CAM program can result in excessive machine motion and undesirably long machining times.

SUMMARY OF THE DISCLOSURE

In one implementation, the present disclosure is directed to a

In another implementation, the present disclosure is directed to a

In yet another implementation, the present disclosure is directed to a

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a flow diagram illustrating a method of designing a flank millable component and manufacturing the component with a flank milling process;

FIG. 2 is a perspective view of an exemplary five-axis milling machine;

FIG. 3 is a top view of an exemplary turbomachinery component that can be designed to be flank millable and then machined using optimized machining instructions;

FIG. 5 is an example graphical user interface for implementing a method of designing a flank millable component;

FIG. 6 is an example graphical user interface for implementing a method of designing a flank millable component;

FIG. 7 is a cross sectional view, in a meridional plane, of a Fully Radial turbomachinery blade geometry with geometry quasi-orthogonal lines;

FIG. 8 is a cross sectional view, in a meridional plane, of a Fully Radial turbomachinery blade geometry with flow quasi-orthogonal lines;

FIG. 9 is an example graphical user interface for implementing a method of designing a flank millable component;

FIG. 10 is a perspective view of a turbomachinery impeller having a plurality of blades with swept leading edges;

FIG. 16A is a perspective view of the turbomachinery blade of FIG. 15;

FIG. 16B is a detailed view of the leading edge of the turbomachinery blade of FIGS. 15 and 16A;

DETAILED DESCRIPTION

Figure 4:
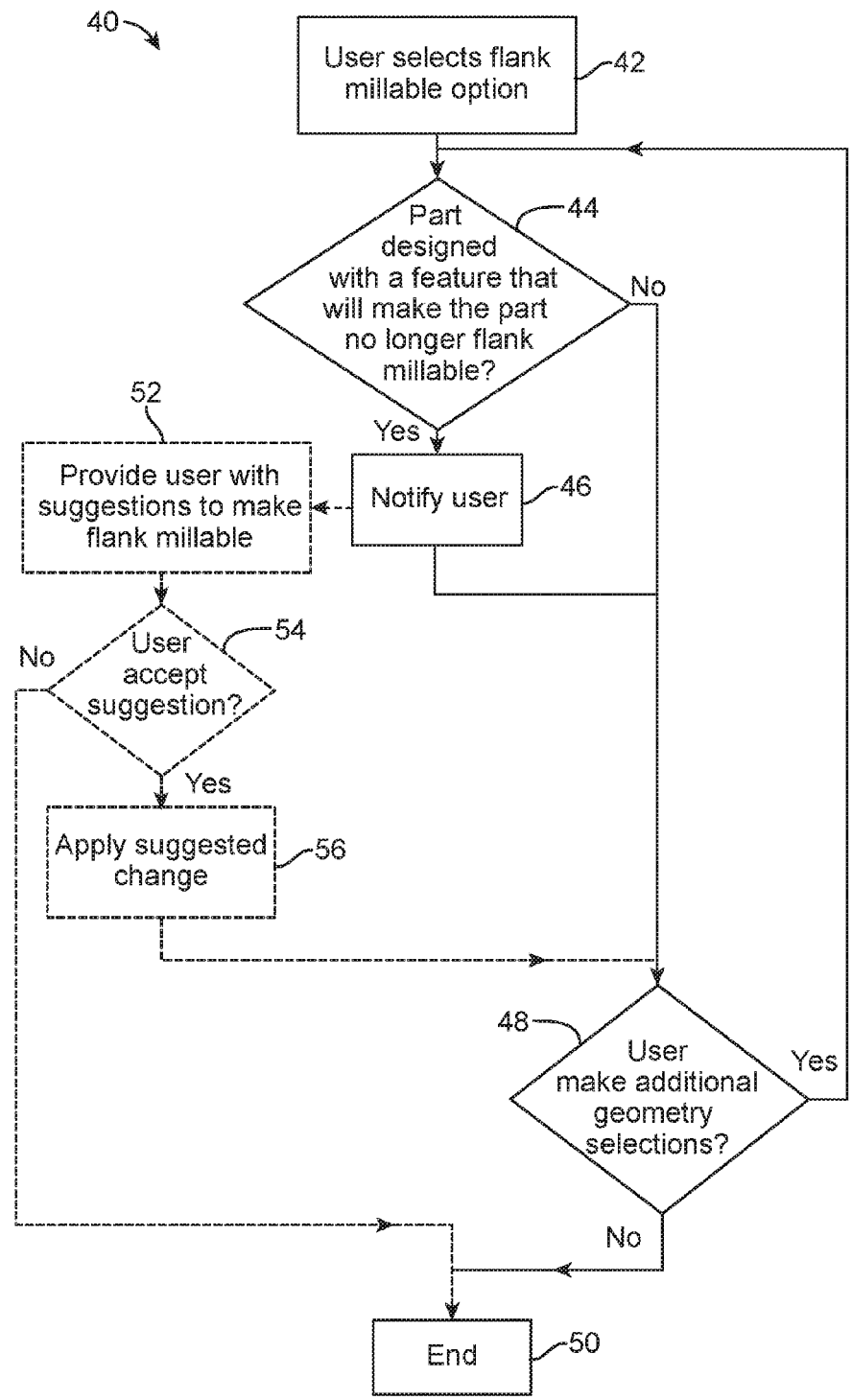
FIG. 4 is a flow diagram illustrating a method of designing a flank millable component.

Some aspects of the present invention include devices, methods, and systems for designing a component that can be machined, at least in part, with a flank milling machining process. Methods of designing a flank millable component include monitoring component geometry options selected by a designer and notifying the designer when a geometry option is selected that will result in the component no longer being flank millable. Other aspects include providing the designer with options to modify the component geometry to make the component flank millable. As will be seen below, such feedback during the design process can be invaluable, ensuring the final component design will be flank millable and avoiding the undesirable situation of not learning until too late in the product design phase that a component cannot be flank milled. Other aspects of the present invention include improved methods of calculating flank milling machining instructions that determine an optimized machining path that results in reduced machining time and superior surface finishes without sacrificing accuracy of the shape of the component. Yet other aspects of the invention include providing the component designer with details on the manufacturability of the component early in the design process.

FIG. 1 shows an example method 5 for designing and manufacturing a flank millable component. As shown in FIG. 1, such a method can begin at step 10, with the design of a flank millable component. As noted above, flank milling involves using the side of a rotary cutter, rather than the end of the cutter, to remove material from a work piece. Designers and manufacturers often try to design components with flank-millable geometries because flank milling can result in improved surface finish and significantly decreased manufacturing time and costs. For example, in the turbomachinery field, the costs for manufacturing a turbomachinery component such as an impeller can be quite high for a number of reasons, including material hardness and complex geometries. Significant reduction in manufacturing time and costs have been realized by utilizing flank milling. In step 10, the component may be designed using computer automated design (CAD) which can involve CAD software operating on one or more computer systems, such as the exemplary systems illustrated in FIG. 34 and described in more detail below. A designer or other operator of the CAD software may select from a myriad of geometry options and geometry modifications to determine the final geometry of the component. During step 10, the CAD software may include various processes that, as will be described in more detail below, are configured to notify the designer when the designer chooses a geometry option that will result in a final component geometry that will most likely not be flank millable. Armed with this valuable information, the designer can make an informed decision to either proceed and design a component that will not be flank millable, or make appropriate adjustments to stay on a flank millable design path. In some embodiments, a CAD program may also include functionality for modifying component geometry to make the component flank-millable and/or improve manufacturability, and may also include functionality for optimizing the structural design of the component while maintaining a flank millable geometry and adhering to the aerodynamic design intent.

After a flank millable component has been designed, at step 12, milling machine instructions are calculated for machining the component. The milling instructions can be determined using computer automated manufacturing (CAM) software that, as with the CAD software, can be implemented on one or more computer systems such as the systems illustrated in FIG. 28. The CAM and CAD software may be either integrated in a comprehensive software package or exist separately. During step 12, a data set developed during step 10 that describes the shape of the component can be converted into machining instructions, such as the paths a milling machine cutter will take over a work piece to remove material to obtain the final component geometry. During step 12, the CAM software can include various processes and algorithms that, as will be described below, may be configured to calculate smooth machining paths that eliminate excessive machine motion and reduce machining time, without compromising component geometry. In one exemplary embodiment, a CAM program may include algorithms for describing an orientation of a cutter in a three dimensional system, such as a spherical coordinate system, and for simultaneously minimizing cutter motion in multiple dimensions, such as both angular planes of a spherical coordinate system, to find an optimal machining path. In some embodiments, the CAM software may include a simulator that allows the manufacturer to assess machining performance, such as machining time, machine motion, and accuracy before machining the part. The manufacturer may alter the optimized machining instructions based on the results of the simulation. After the machining instructions are determined, at step 14, the part is machined using flank milling for at least a portion of the machining process. In addition the present disclosure, one or more aspects contained in U.S. Provisional Patent Application Ser. No. 61/720,166, filed Oct. 30, 2012, entitled "System and Method of Flank Milling a Turbo-Machinery Blade Using Ruled Surfaces," and U.S. Non-Provisional patent application Ser. No. 14/067,652, filed Oct. 30, 2013, entitled "Methods, Systems, and Devices For Designing and Manufacturing Flank Millable Components," both of which are incorporated by reference herein in their entireties, may be utilized for implementing one or more aspects of the present disclosure.

FIG. 2 shows exemplary milling machine 20 that may be used with the processes described herein to flank mill component 22 (also referred to herein as work piece 22). In one embodiment, milling machine 20 is a five-axis milling machine having work piece table 24 that can move in two Cartesian directions and one rotary direction and head 26 that can move in one Cartesian direction and one rotary direction. Head 26 is configured to drive rotary cutter 28 which can be used to machine work piece 22 mounted on work piece table 24. While the methods described herein can be used to design and manufacture any number of different types of components, work piece 22 shown in FIG. 2 and in greater detail in FIG. 3, is an exemplary turbomachinery component that can be designed to be flank millable using the processes disclosed herein and also machined using optimized machining instructions also disclosed herein. Component 22 is an exemplary impeller, having a plurality of blades 25 (only three labelled to avoid clutter) that have ruled surfaces 29 defined by guide curves 30 and 31 (only one of each labeled) connected by geometry quasi-orthogonal (QO) lines 32 (also referred to herein as rulings 32). As used herein and described in more detail below, a ruled surface can generally be assumed to be flank millable within typical tolerances. A ruled surface is a surface that can be represented by two or more guide curves, such as guide curves 30 and 31, connected by a plurality of geometry QO lines 32. Complex three dimensional surfaces can be ruled, and for some shapes, such as twisted surfaces, the straight lines or rulings may not be parallel. In addition, some non-ruled surfaces can also be flank milled. The methods of determining improved flank milling instructions described herein can also be used to flank mill some types of non-ruled surfaces.

FIG. 4 illustrates an exemplary process 40 for carrying out step 10 of method 5 described above—designing a flank millable component. Process 40 is an exemplary method that may be implemented in computer software code, such as CAD software configured to design turbomachinery components. Process 40 begins at step 42 with a user selecting a flank millable option, which activates various processes described herein for monitoring the user's geometry selections. At step 44, the program monitors the user's selections to determine if a selection has been made that will result in a component that is not flank millable. If the user has selected such an option, the process continues to step 46 and notifies the user. After notifying the user, at step 48, if the user has made additional geometry selections, the program returns to step 44, and if not, at step 50 the process ends. In some embodiments, process 40 also includes optional steps for providing the user with suggestions for modifying the component geometry to make it flank millable. More specifically, after notifying the user at step 46, the process at step 52 may provide the user with suggestions for making the component flank millable. At step 54, the exemplary program may determine whether the user has accepted the suggestion, and if not, at step 50, the program ends. In alternative embodiments, the program may provide a notification that process 40 will end because the user has declined to select a flank millable geometry. In yet other embodiments, the process 40 can determine whether the user has made a change other than the change suggested at step 52 that results in a flank millable geometry, and if so, continue to step 48 to determine whether the user has made additional changes. Returning to step 54, if the user accepts the suggested change to the geometry, at step 56, the change is applied to maintain a flank millable component design. The process then continues to step 48 to determine if the user has made additional selections. If not, at step 50 the process ends, and if so, the process returns to step 44 to determine whether the additional selections will make the part no longer flank millable.

FIGS. 5, 6, and 9 illustrate example graphical user interfaces (GUIs) that may be used to implement process 40. FIG. 5 illustrates an example basic geometry GUI 60 that provides basic component geometry options 62, 64, and 66, as well as flank millable option 68 and sub-options to maintain a flank millable geometry 70. As discussed above, a CAD program may provide a user with a plurality of component geometry options, with some options resulting in the component not being flank millable. Basic geometry GUI 60 categorizes a plurality of basic geometry options as either Type A geometries 62 that are normally flank millable, Type B geometries 64 that can be flank millable if additional sub-options are selected or modifications applied, and Type C geometries 66 that are assumed to be not flank millable. Flank millable option 68 is an example of an option monitored in step 42 of process 40 and, in the illustrated example, selecting option 68 will activate the flank milling checks in process 40. Sub-options 70 can be one or more options that allow for at least a portion of the component to be flank millable despite the selection of a geometry that could otherwise make the component no longer flank millable. For example, if the user selects a Type B geometry in category 64, the user could be prompted to select an appropriate sub-option 70 to maintain the component as flank millable. In addition, as discussed in more detail below, the user may select a modification to one of the basic geometry models in categories A or B that would result in the component no longer being flank millable or at least the program no longer considering the component as being flank millable. In such a case, the user may be prompted to select an appropriate sub-option 70 to maintain a flank millable geometry, or to relax certain design constraints so the program can consider the geometry as flank millable.

FIG. 6 illustrates an exemplary basic geometry GUI 74 having a plurality of basic geometry options 76 for designing a turbomachinery component. GUI 74 also has a flank millable option 78 and sub-options 80. In the exemplary GUI 74, "Independent hub and shroud," "Explicit shroud, radial inlet, exit rake," "NACA 65 Airfoil blades," "CETI (Patented)," "Specify shroud and lean angle," "Use blade sections defined in Z," and "RTheta 2D Wedge Diffuser" are basic turbomachinery blade geometry options that can be defined by ruled surfaces, or in other words, can result in a flank millable component and would be considered a Type A geometry 62 in example GUI 60. "Fully radial," "2-D with Bezier beta distribution," "2-D with straight or circular arc blades," and "Use a separate blade generating sheet" would be considered Type B geometries 64 requiring additional checks to ensure the component is flank millable. "2D Wedge Diffuser," "Custom," and "Specify hub and extrusion direction" would be considered Type C geometries, or in other words, are assumed to be not flank millable. As will be appreciated by a person of ordinary skill in the art (POSTA), any number of other blade geometry options whether currently existing or developed in the future, may be included and categorized into types A-C geometries. In one exemplary embodiment, if a user has selected a Type C geometry, flank millable option 78 may be greyed out, or otherwise not selectable. In another embodiment, if the user selects flank millable option 78 after selecting a Type C geometry, the program would warn or prompt the user that a flank millable geometry is not available for the basic geometry model selected.

The "Fully radial," "2-D with Bezier beta distribution," "2-D with straight or circular arc blades," and "Use a separate blade generating sheet" geometries are exemplary Type B geometries because some additional modification(s) or sub-option(s) must be made or selected to ensure the resulting component geometry is flank millable. In this example, these geometries fall under Type B because they have the common characteristic of being defined by a zero-thickness mean camber sheet with a separate user-defined thickness from the mean camber sheet. As discussed above, a surface defined by ruled elements can be assumed to be flank millable. In one embodiment, if a user selects one of these geometries, the geometry will be considered flank millable if the user defines the thickness of the blade along ruled lines. If the user defines the thickness along another set of lines, the geometry may be considered not flank millable. FIGS. 7 and 8 further illustrate two exemplary options for defining the blade thickness for the "Fully Radial" blade geometry. FIG. 7 illustrates a blade shape 82 defined by ruled line elements, or geometry QO lines 84. As shown in FIG. 7, in the illustrated embodiment, geometry QO lines 84 have a constant Z and theta in a cylindrical coordinate system. By contrast, FIG. 8 illustrates the same blade shape 82 defined by flow QO lines 86 that, as is known by persons having ordinary skill in the art, are lines that are quasi-perpendicular to a working fluid flow direction and used to calculate working fluid flow. If the user defined a thickness from the mean camber sheet along the flow QO lines rather than geometry QO lines 84, the resulting surface may not be defined by straight or ruled lines. Thus, additional checks are necessary for these example Type B geometries, here, checking the thickness definition, to confirm the blade will be flank millable. As will be appreciated, CAD programs made in accordance with the present disclosure may have similar checks or modifications for other component geometries having other geometry and flow QO line orientations.

In the example embodiment, the "Fully radial," "2-D with Bezier beta distribution," and "2-D with straight or circular arc blades," have the common characteristic that thickness is normally applied along flow OQ lines, but if the thickness were applied along the geometry QO lines, the resulting change in component geometry is typically very small. Thus, in one embodiment, when a user selects one of these three Type B geometries, and has selected the flank millable option 78 (FIG. 6), the CAD program may automatically apply the user's thickness definition along geometry QO lines, rather than flow QO lines to ensure the component will have a ruled surface. In an alternative embodiment, the program could warn the user that the thickness must be applied along the geometry QO lines and ask if the thickness definition should be applied along the geometry QO lines. In yet another embodiment, the program could perform an additional check to evaluate the effect of changing the thickness from flow to geometry QO lines on the shape of the component and only change the thickness automatically if the difference is less than a predetermined value.

The "Use a separate blade generating sheet" option (FIG. 6) is an example of a Type B geometry 64 (FIG. 5) because the lines along the blade generating sheet on which the thickness definition is applied is separately defined. Thus, additional sub-options must be selected to ensure the geometry will be flank millable. FIG. 9 illustrates a GUI with examples of user-defined sub-options 90 for the "Use a separate blade generating sheet" option. In this example, two sub-options are relevant to ensuring the geometry is flank millable. Sub-option "Linear theta from hub to shroud" 92 should not be selected because it would define a mean camber sheet that is not ruled in (x,y,z) space, and sub-option "Thickness based on the blade generating lines" 94 should be selected because it will apply thickness along the geometry QO lines.

Referring again to FIG. 6, basic geometry GUI 74 may have sub-options 80 to maintain flank millable geometry that can be selected to provide a user with increased flexibility in blade geometry options while still maintaining a blade geometry that will be, at least in part, flank millable. Exemplary sub-options 80 may include "Allow for point milled leading and trailing edges" 96 and "Allow more than two sections to represent the blade shape" 98. Sub-options 96 and 98 are examples of geometry options that allow the program to consider more complex shapes flank millable so that a user can modify a basic geometry, such as one of the basic geometry options 76, while still maintaining a surface that the program considers flank millable.

Sub-option "Allow more than two sections to represent the blade shape" 98 may be used in situations where the user modifies an otherwise flank millable blade geometry such that additional sections are needed to fully describe the blade. For example, FIG. 10 shows an example turbomachinery impeller 100 having a plurality of blades 101 with swept leading edges 102. In this example, dotted line 103 represents the leading edge for the original basic blade geometry. The geometry of blades 101 were modified with an edge cut, here an end portion of the blades being removed, resulting in swept leading edges 102. The original basic blade geometry could be represented by two sections—a hub guide curve or section 104 and a shroud guide curve or section 105. Before making the edge cuts, the program would consider blades 101 to be flank millable because the blades could be represented by two sections ruled line elements 106 (also referred to as geometry QO lines 106) extending between. The edge cuts for the swept leading edge 102, however, cut across ruled line elements 106 such that the entire surface of blade 101 can no longer be represented by line elements 106 extending between two sections 104 and 105. Sub-option 98, however, allows the user to relax the constraints the CAD program uses to determine whether blades 101 are flank millable. By selecting sub-option 98, the program will allow for the addition of one or more guide curves to bound ruled line elements 106 that no longer extend from curve 104 to curve 105. Thus, if a user selects the flank millable option 78 (FIG. 6) and adds a swept leading or trailing edge to an otherwise flank millable geometry, such that the entire blade can no longer be represented as a ruled surface with two guide curves, the program can check to see if the user has selected sub-option "Allow more than two sections to represent the blade shape" 98 and if the sub-option is not selected, warn the user that the edge cuts makes a two section representation impossible. In alternative embodiments, the program could also suggest that sub-option 98 be selected to allow the program to maintain at least a portion of the blade as flank millable.

Figure 11:
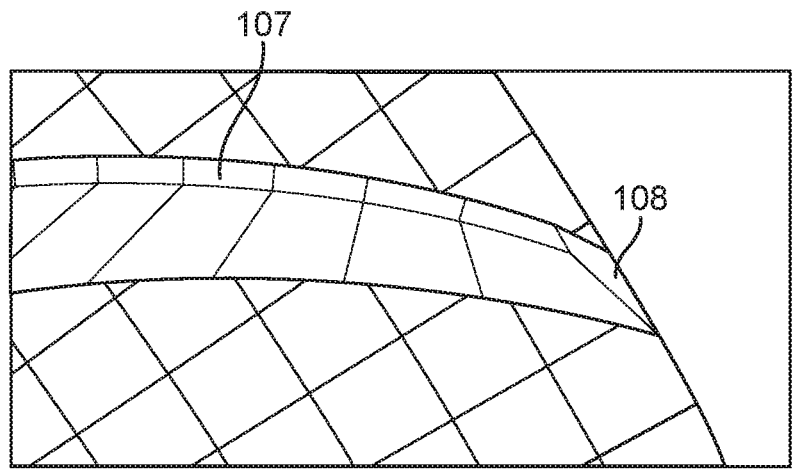
FIG. 11 is a perspective view of a turbomachinery blade having a sheared edge.
Figure 12:
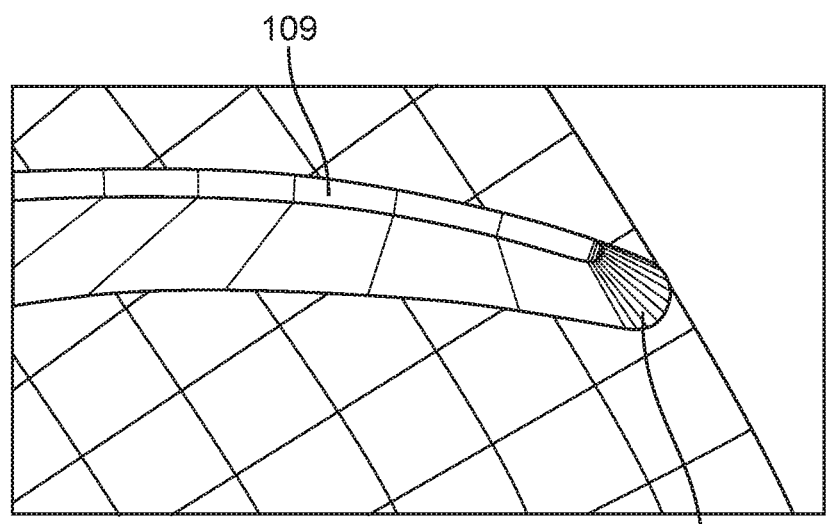
FIG. 12 is a perspective view of a turbomachinery blade having a rounded edge.

FIGS. 11 and 12, illustrate another example of a geometry modification that may require the selection of additional sub-options to allow the program to describe at least a portion of the blade with a ruled surface. As shown in FIGS. 11 and 12, blade 107 (FIG. 11) has a sheared leading edge 108, while blade 109 (FIG. 12) has a rounded leading edge 110. A rounded leading edge that is straight and that can be defined by ruled line elements can be flank milled, but if the rounded leading edge is not, for example, if a rounded edge is added to a swept leading or trailing edge, then without further modifications, it may no longer be possible to represent the rounded edge with a ruled surface. Sub-option 96 "Allow for point milled leading and trailing edge" (FIG. 6) provides increased flexibility so that a user can specify a non-ruled rounded leading or trailing edge. If the user specifies a non-ruled rounded edge on an otherwise flank millable shape and has selected sub-option 96, the program will consider the component flank millable, allowing for the rounded edges to be defined separately and point milled. In an exemplary embodiment, if a user selects the flank millable option 78 (FIG. 6) and selects an otherwise flank millable basic geometry from the basic geometry options 76, but then specifies a non-ruled rounded trailing or leading edge, the program can check to see if the user has selected sub-option "Allow for point milled leading and trailing edge" 96 and if the sub-option is not selected, warn the user that the rounded edge will require point milling. In an alternative embodiment, the program could also suggest that sub-option 96 should be selected to allow the program to maintain at least a portion of the blade as flank millable. As described below, exemplary CAD programs may also include edge geometry options that may allow a user to modify the geometry of a rounded edge that is being applied to a swept leading edge that may allow the entire blade to be flank milled.

Figure 13:
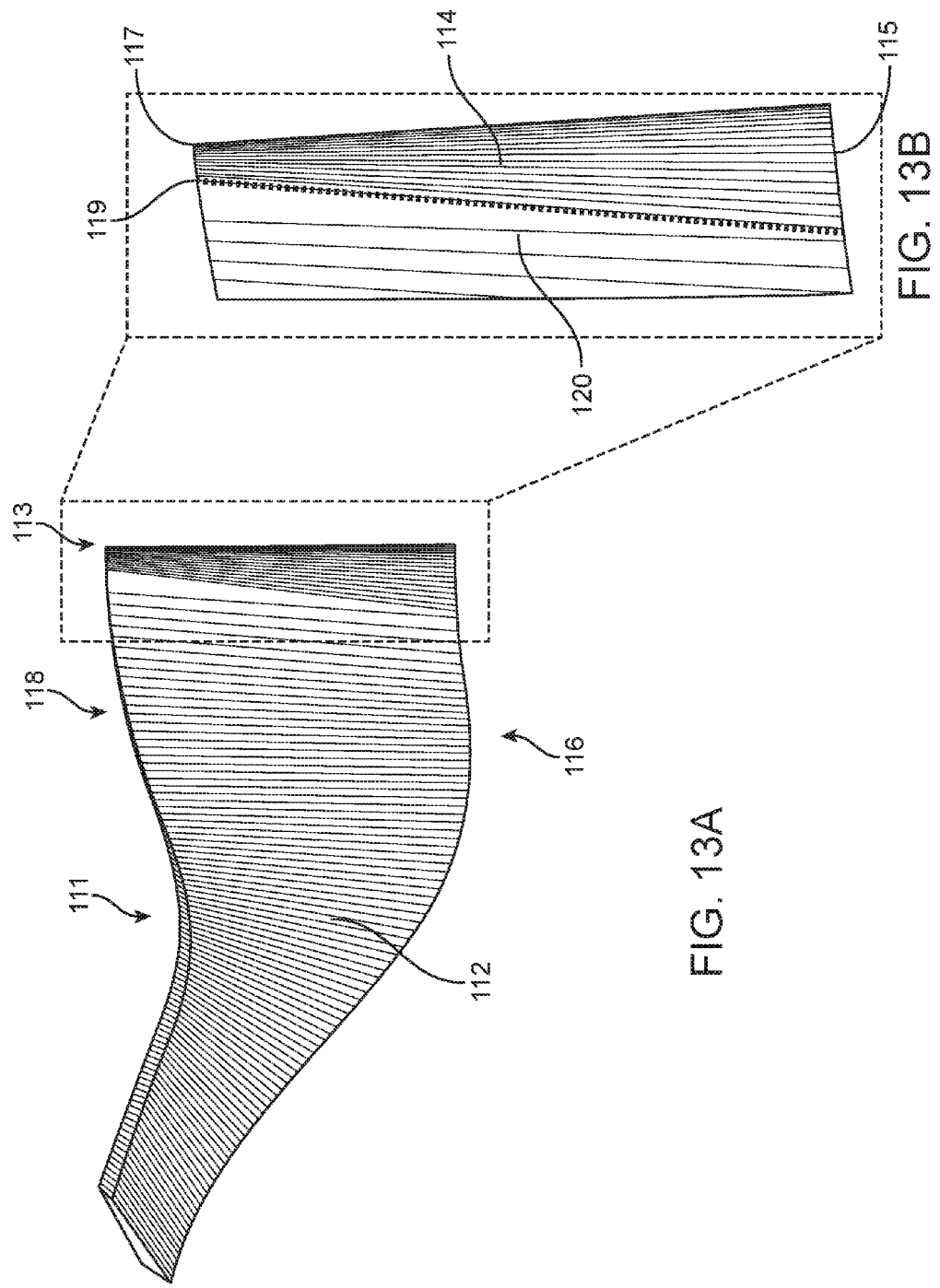
FIG. 13A is a perspective view of a turbomachinery blade having a rounded leading edge.
FIG. 13B is a detailed view of the leading edge of the turbomachinery blade of FIG. 13A.

FIGS. 13A and 13B illustrate another example of a blade geometry 111 having a ruled blade surface 112 that can be flank milled but having a rounded leading edge 113 that likely requires either a separate flank milling operation or a point milling operation because of the shape distribution of the edge. As shown in FIGS. 13A and 13B, exemplary edge 113 may be defined as a ruled surface with QO lines 114 extending between edge portion 115 of hub section 116 and edge portion 117 of shroud section 118 and may include edge transition 119 where leading edge 113 begins. Unless otherwise specified, the terms shroud section and tip section as used herein are synonymous and both refer to the section defining the extreme of a blade opposite a hub section of a blade. Unless otherwise specified, a blade referred to as having a shroud section or tip section may refer to any type of turbomachine blade. As shown in FIGS. 13A and 13B, the shape of edge 113 results in edge transition 119 that is not aligned or coincident with adjacent blade surface QO line 120 and that is spaced from and at a different orientation than the blade surface QO line. Depending on the size of the spacing between blade surface 112 and edge transition 119 and the extent of the difference in orientation, such a spacing can make it difficult to machine the entire blade with a flank milling operation. For example, one or more of edge QO lines 114 may need to be modified such that they are no longer linear resulting in an edge that is no longer defined by a ruled surface. Even if the edge can be flank milled, the discontinuity between blade surface 112 and edge 113 can result in poor surface finish and longer machining times.

Figure 14:
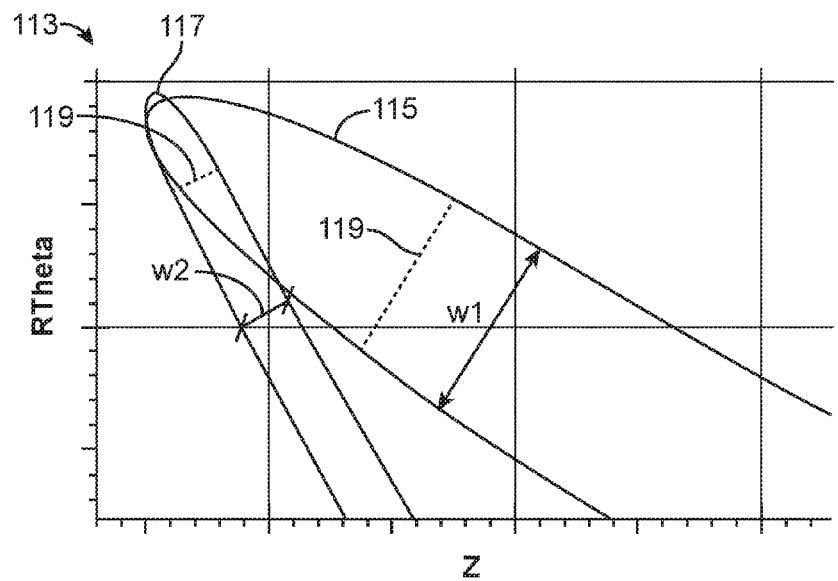
FIG. 14 shows cross-sectional geometrical proportions of the turbomachinery blade of FIGS. 13A and 13B at hub and shroud sections.

FIG. 14 illustrates the cross-sectional shape of rounded leading edge 113, and shows the profile of edge 113 at edge portion 115 of hub section 116 and edge portion 117 of shroud section 118. In the illustrated example, leading edge 113 has an elliptical shape, and has a constant ellipse ratio across the entire edge, where the ellipse ratio is defined as the ratio of ellipse major to minor axis lengths. In the illustrated example, the blade does not have a constant width from hub to tip and instead a width w1 of the blade at the hub is greater than a width w2 of the blade at the tip. With a constant ellipse ratio edge shape, the varying blade width results in a corresponding variation in ellipse major axis length along the blade edge, resulting in the spanwise length of edge 113 varying between hub and shroud edge portions 115 and 117 and the resulting orientation of blade transition 119. To flank mill a blade in a way that preserves the intended geometric shape, the orientation of the milling tool must be substantially parallel to the QO lines. In the illustrated example, with the application of a constant ellipse ratio, and as the ratio is increased, machining the leading edge becomes increasingly difficult using a flank milling technique and at a certain point may not be possible. Thus, the geometry of rounded leading edge 113 will likely result in blade 111 requiring a separate point milling operation to machine the leading edge, whereas if the geometry of leading edge 113 was modified so that the orientation of edge QO lines 114 was in closer agreement with the orientation of adjacent blade surface QO line 120, a continuous flank milling operation could be used for machining the blade.

Figure 15:
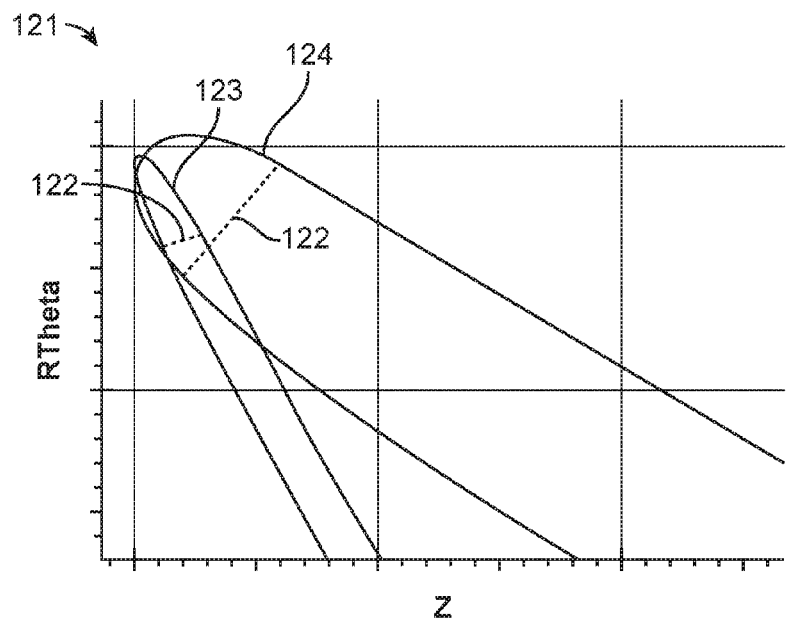
FIG. 15 shows cross-sectional geometrical proportions of another turbomachinery blade.

FIGS. 15 and 16A and 16B illustrate one exemplary modification to the leading edge of blade 111 so that the blade can be manufactured with a continuous flank milling operation. As shown, blade 111 may be modified to include a ruled leading edge 121 that can be flank milled by modifying the shape of the edge. As shown in FIGS. 16A and 16B, in the illustrated example, the shape of leading edge 121 may be adjusted so that edge transition 122 (where blade surface 112 ends and leading edge 121 begins) is substantially aligned, or in some cases, substantially coincident with adjacent blade surface QO line 120. In yet other cases, an edge shape may be selected that results in edge transition 122 being substantially parallel with adjacent blade surface QO line 120. As will be appreciated by a person having ordinary skill in the art, the degree of alignment between a edge transition and blade surface QO line that is required to flank mill the blade surface and the edge in a continuous machining operation can vary and can depend on a variety of factors, including desired surface finish, desired machining time, and the complexity of the blade shape. In one example, a minimum degree of alignment is required for enabling a continuous flank milling procedure, and closer alignment may result in improve manufacturability such as improved surface finish and reduced cutter motion.

Such a modification can have a variety of benefits including reducing machining time and costs and improving the surface finish of the blade. As shown in FIG. 15, in the illustrated example, the shape profile for leading edge 121 was adjusted from the constant ellipse ratio of leading edge 113 of FIGS. 13-14 to a substantially constant ellipse major axis length, resulting in the blade having a varying ellipse ratio. In the illustrated example, a shape of blade 111 at edge portion 123 of shroud section 118 was held constant and a shape at edge portion 124 of hub section 116 and portions therebetween were adjusted to obtain a ruled surface with QO lines that are substantially aligned with adjacent blade surface 112 adjacent QO line 120. In one example, the ellipse major axis at edge hub section 124 may be set to the same as the ellipse major axis at edge shroud section 123 and a linearly or non-linearly varying shape distribution may be applied between the edge hub and shroud sections. Thus, in one embodiment, rather than specifying a constant ellipse ratio, a user may specify, e.g., a variable ellipse ratio or constant ellipse major axis length, or hub and tip section shapes with linear or non-linear variation between, etc., to define a rounded leading edge that is flank millable.

As will be appreciated, the foregoing is provided merely by way of example and similar edge geometry modifications may be employed to any rounded edge. The term rounded edge as used herein broadly refers to any edge with a rounded profile, e.g., a rounded profile defined by any mathematical curve, including circular, parabolic, Bezier, etc. In one example, a CAD program may include features for defining leading and trailing edge geometries that may allow a user to specify an edge geometry at a hub or shroud/tip section. Exemplary programs may also allow a user to specify a constant or varying edge shape profile along the length of the edge, including shape profiles that vary both linearly and non-linearly along the length of the edge. In another embodiment, a user may specify certain constraints on an edge shape, such as elliptical or parabolic and hub or tip geometry, etc. and the CAD program may be configured to automatically determine an edge shape profile distribution that results in a ruled edge. In one example, the program may determine an edge shape profile resulting in the edge transition that has a within-tolerance orientation to an adjacent blade surface QO line. For example, the program may calculate an edge shape that results in an edge transition that has a within-tolerance spacing from an adjacent blade surface QO line along both the hub and shroud sections 116, 118. For example, the program may evaluate a rate of change in blade surface QO line spacing along hub section 116 at a location adjacent an edge transition and then confirm the rate of change along the hub section between the last blade surface QO line and the blade transition is within a certain tolerance value of the blade surface QO line spacing rate of change. The program may perform a similar check along shroud section 118. If the rate of change in spacing along either hub or shroud section 116, 118 is not within tolerance, in one embodiment, the program may adjust the edge shape distribution until the rate of change is within tolerance, indicating the orientation of the edge transition is sufficiently aligned with adjacent blade surface QO line orientation. In another embodiment, the program may notify the user the edge transition is out of tolerance and allow the user to modify the edge geometry. In another example, the CAD program may calculate an edge geometry that results in a blade transition that is substantially coincident with an adjacent blade surface QO line. In yet another example, a CAD program may evaluate one or more of an orientation and location of a blade edge transition line and determine whether the orientation and location are within a predefined tolerance of an adjacent first blade surface QO line where the predefined tolerance may be based on a difference in spacing between adjacent first blade surface QO lines proximate the first blade transition line.

In yet another example, a CAD program may include a graphical user interface (GUI) that includes a dynamic display of a blade geometry and may allow a user to manually adjust an edge shape by, e.g., entering edge geometry inputs, and the GUI may automatically modify the graphical display showing the resulting change to edge geometry and change to edge transition orientation. Such edge modifications can enable the development of blade geometries including rounded leading or trailing edges that may be machined with a continuous flank milling procedure while resulting in negligible changes to the aerodynamic design of the blade. Such modifications may also improve the manufacturability of a blade. For example, a first rounded edge shape that is flank millable may be modified to have geometry QO lines that are in closer alignment with blade surface geometry QO lines, which may result in a smoother flank milling cutter motion, resulting in improved surface finish and reduce machining time.

Referring again to FIG. 6, in one example, if a user has selected option 78 (create a flank millable blade surface) but has not selected option 96 (allow for point milled leading and trailing edges) and has selected a non-ruled leading or trailing edge, in addition to generating a warning that the selection will result in a blade that is not flank millable, the program may ask the user if he or she wishes to employ one of the edge geometry subroutines described above for modifying the edge to make the edge flank millable. In one example, even if the user has selected point milling option 96, the program may still notify the user when he or she has selected an edge geometry that will likely require point milling and query whether the user wishes to modify the edge geometry to make the edge flank millable.

Figure 18:
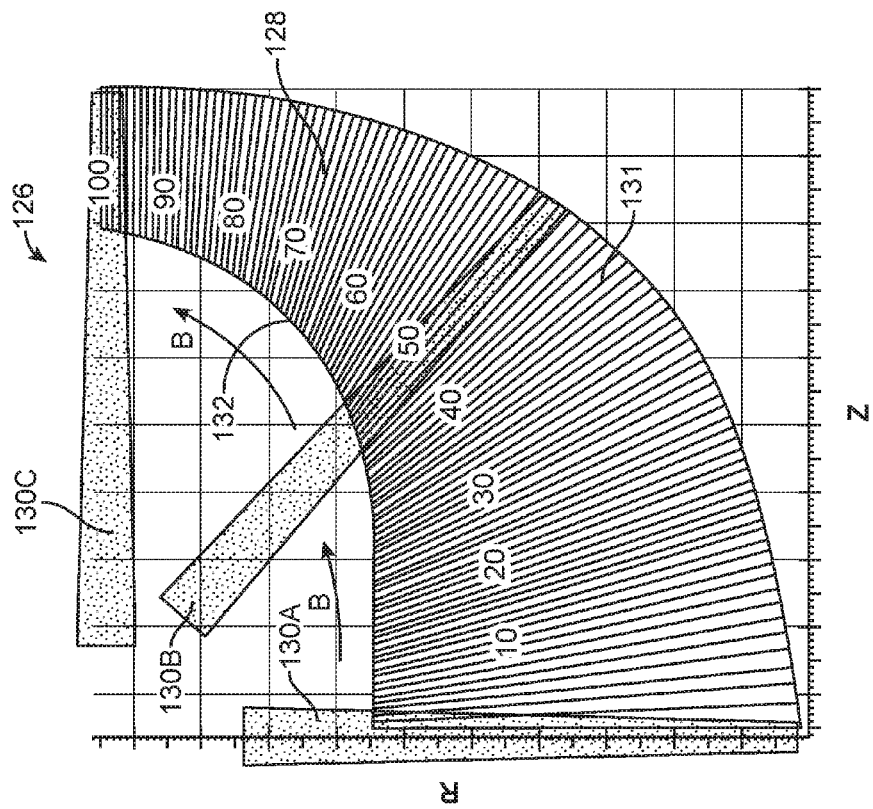
FIG. 18 shows another example of a blade geometry defined by geometry QO lines and approximate flank milling cutter orientations required for flank milling the blade.
Figure 17:
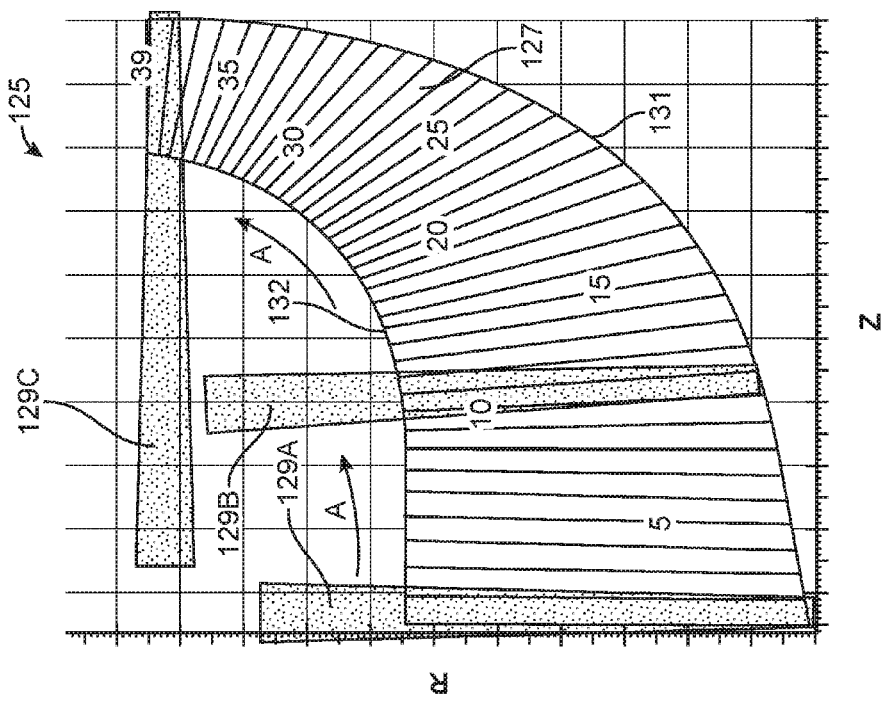
FIG. 17 shows an example blade geometry defined by geometry QO lines and approximate flank milling cutter orientations required for flank milling the blade.

In addition to modifying edge QO lines to improve manufacturability, blade surface QO lines may be modified in a way that has a minimal impact on the aerodynamic design of the blade while having an appreciable impact on machining. As noted above, to flank mill a blade in a way that preserves the intended geometric shape, the orientation of the milling tool must be substantially parallel to the QO lines. Thus, an orientation of blade surface geometry QO lines can have a direct impact on cutter orientation, cutter head motion, and surface finish. FIGS. 17 and 18 illustrate first and second blade geometries 125 and 126 having first and second blade surface QO lines 127 and 128. FIGS. 17 and 18 also conceptually illustrate three orientations 129A-C of a milling tool at three spanwise locations along blade 125 with a cutter tool direction of movement illustrated by arrows A and similarly shows three cutter orientations 130A-C along blade 126 with a cutter tool direction of movement illustrated by arrows A. FIGS. 17 and 18 illustrate how the different orientation of blade surface QO lines 127 and 128 can impact cutter orientation. As shown, the orientation of blade surface QO lines 128 of blade 126 will likely result in improved machining time and surface finish as compared to blade 125 because, as can be seen from a comparison of FIGS. 17 and 18, the orientation of QO lines 128 will result in a smoother cutter motion, with a rate of change of the cutter along hub and shroud sections 131 and 132 being more similar for blade 126 than for blade A. For example, a comparison of cutter orientation 129B for blade A to orientation 130B for blade 126 shows that for blade A, to transition from orientation 129B to orientation 129C will involve substantially more cutter motion along hub section 131 than shroud section G. Such uneven motion can negatively impact machine motion and surface finish. By contrast, cutter orientations 130A-C suggest a more even rate of motion along hub and shroud sections 131 and 132 for blade B.

In one example, blade geometry QO line orientation may be manually manipulated by the user to define a set of QO lines that maintain aerodynamic intent while improving machining. In another example, a CAD program may have a subroutine for adjusting blade surface and/or blade edge QO line orientation to minimize uneven cutter motion. In one embodiment, a CAD subroutine may determine a rate of change in QO line spacing along a hub and shroud section and may adjust the orientation of one or more of the QO lines when a rate of change along one of the hub and shroud sections is not within a predefined tolerance of a rate of change along the adjacent corresponding portion of the hub or shroud section. In some embodiments, the QO line orientation subroutine may also check other blade geometry values such as camber angle, thickness, and exit lean angle, etc. and not change the QO line orientation if doing so would result in an out-of-tolerance change to one or more of the blade geometry values. In another embodiment, a CAD program may be configured to calculate an estimated flank milling cutter motion speed along the hub and shroud sections based on a set of blade surface QO lines and in one embodiment, the program may also include instructions for a flank milling optimizer user interface (UI) for displaying the estimated cutter speed and for receiving a user selection for specifying or modifying geometry QO line orientation to reduce cutter motion or otherwise adjust flank milling performance. In some embodiments, the flank milling UI may also be configured to generate a graphical display of the blade geometry including graphical indicators at blade locations where a difference between the hub and shroud cutter motion speed is greater than a tolerance value, indicating locations of excess or uneven cuter motion, which can aid a user in selecting optimal QO line orientations. Thus, a combination of managing blade surface QO line orientation and proper selection of edge shape, such as proper selection of edge hub and tip ellipse ratios, allows for a blade surface shape that can be machined using a flank milling process with a continuous motion of the mill and for improved surface finishes from reduced cutter motion.

As described above and more fully below, the edge shape design techniques disclosed herein may be used to generate machining instructions for machining a blade, where the blade may include a flank millable edge. In one embodiment, a turbomachinery component may be manufactured with one or more of the techniques disclosed herein and the component may include a plurality of blades each having a pressure surface, a suction surface, and leading and trailing edges, where at least one of the leading and trailing edges have a rounded shape that was machined with a flank milling machining operation, where the rounded edge may have an elliptical shape with a varying ellipse ratio. In some embodiments, the pressure surface, suction surface, and at least one of the leading and trailing edges may be machined with a continuous flank milling machining operation. As will be appreciated by a person having ordinary skill in the art, such a turbomachinery component can differ from a turbomachinery component having substantially the same configuration but made by a different machining procedure. For example, a component that is machined from a continuous milling procedure may have an improved surface finish relative to a component manufactured by another process. In addition, a turbomachinery component may be manufactured with a flank milling procedure using a milling machine having a work piece table and a rotary cutter. In one example, a work piece may be placed on the milling machine work piece table, and machining instructions may be received for flank milling the work piece, where the machining instructions may include instructions for forming a turbomachinery blade from the work piece by performing a continuous flank milling motion to form a blade surface and rounded edge. Further, in some embodiments, machine instructions may include a series of sequential cutter positions for machining the blade, where the cutter positions include a first cutter position adjacent an end of the blade surface and a second cutter position in series sequence with the first cutter position adjacent an edge transition where the rounded edge begins. In some embodiments, the orientation of the cutter in the first cutter position is substantially parallel to an orientation of the cutter in the second position.

As shown in FIGS. 14 and 15, the exemplary modification to the leading edge shape distribution resulted in a change in the shape of the leading edge at the hub (compare the shape of edge 113 at edge hub section 115 to the shape of edge 121 at edge hub section 124). While such a change can, as discussed above, have a significant impact on manufacturability, such a change may have a negligible impact on the aerodynamic design of the blade due, in part, to the lower working fluid velocities proximate the hub. Such a change, however, may also have an appreciable impact on the structural characteristics and vibrational performance of the turbomachinery component. For non-limiting example, the illustrated edge profile modification from edge 113 to edge 121 may result in an increase in blade stiffness, raising the fundamental eigenfrequencies, and also increasing the cross sectional area at the blade edge, helping to reduce blade bending stress. In one embodiment, such a change to the leading edge shape may result in approximately a 0.5% to 20% change in the first blade bending mode natural frequency. In another embodiment, adjusting a blade edge shape using the techniques disclosed herein may result in approximately a 5% to 10% change. In yet another embodiment, the orientation of one or more blade surface QO lines may also be modified to adjust the natural frequencies of the blade. Thus, modification of the edge shape may be utilized to both enable a flank millable geometry as well as adjust the vibrational design of the blade. In one embodiment, one or more of a CAD and finite element analysis (FEA) program may be utilized to design a leading or trailing edge shape profile that is both flank millable and that provides a desired natural frequency. For example, an edge geometry program may be configured to apply a flank-millable constraint on the blade edge shape distribution, such as requiring an edge transition to be aligned with blade surface QO lines, and also provide a variety of options for specifying or adjusting the blade edge shape distribution to adjust the natural frequency of the blade to a desired value. Such a program may provide a powerful design tool for optimizing the vibrational performance and manufacturability of the blade. In one example, a modeling strategy can be used to control blade stress and tune eigenfrequencies by increasing a thickness taper ratio of an elliptical edge and locally controlling blade lean angle through varying the QO line orientation. The effect of QO position on blade eigenfrequencies can be quantified by performing simulations with a Finite Element Analysis program.

The foregoing discussion of specific basic blade geometries and blade geometry modifications are merely exemplary embodiments implementing the broader concepts disclosed herein. In alternative embodiments, the methods and processes described herein may be applied to a myriad of other turbomachinery component geometries, as well as components other than turbomachinery components.

Figure 19:
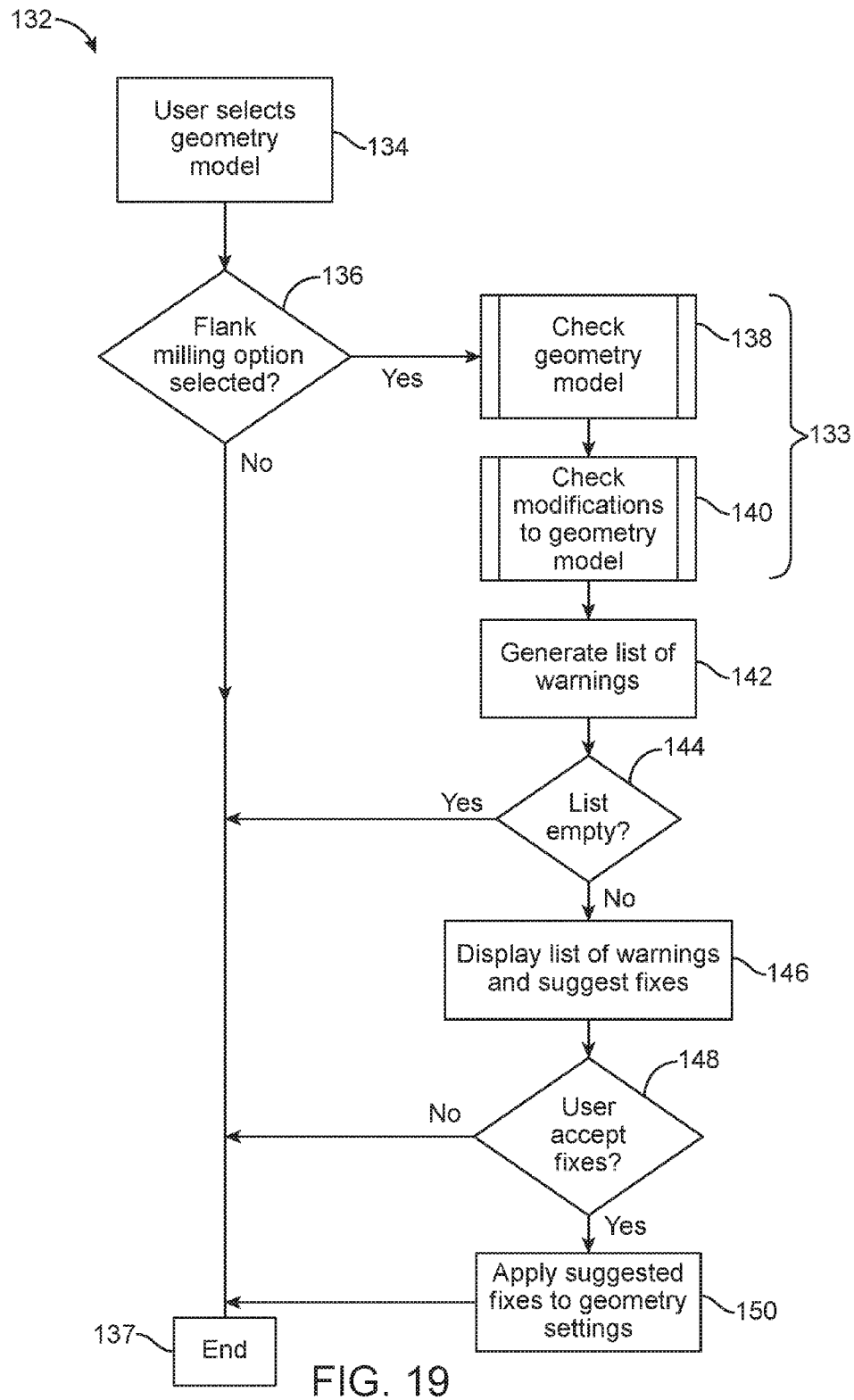
FIG. 19 is a flow diagram illustrating a method of designing a flank millable component.

FIG. 19 illustrates exemplary method 132 for designing a flank millable component, where a computer program, such as a portion of a CAD program, monitors component geometry throughout a design process and notifies a user if the component design veers from a flank millable geometry. FIG. 19 illustrates at a high level, method 132, which includes, inter alia, sub-routines 133. Example embodiments of subroutines 133 are described in more detail in connection with FIGS. 21-23. Method 132 begins at step 134 with the user selecting a component geometry model, and at step 136, checks to see if the user has selected a flank milling option, such as flank millable option 78 (FIG. 6) indicating the user wants to design a flank millable component. If the user has not selected the flank millable option, at step 137, the process ends. If the user has, at step 138 the program checks the geometry model chosen by the user, and at step 140, checks any geometry modifications made by the user. During subroutines 133, the program can provide applicable warnings or notifications 142 related to ensuring the blade is flank millable. At step 144 the program can check if such warnings are generated and if so, at step 146 can display the warnings and can also display suggested fixes. At step 148 the program can check if the user has adopted any of the suggested fixes and if so, at step 150 can apply the fixes and then at step 137 the program ends. In alternative embodiments, after step 150, the program can monitor the component design for additional changes, and if changes are made, re-perform steps 136-150.

FIGS. 14 and 16 illustrate an exemplary embodiment of the check geometry model subroutine 138 (FIG. 19). The illustrated example of sub-routine 138 begins with check basic geometry model subroutine 160 which checks whether the basic geometry model selected, for example, the basic geometry models 76 in example GUI 74 (FIG. 6), is flank millable. After checking the basic geometry model, at step 162, the program determines whether a geometry defined by a zero thickness mean camber sheet with a separate thickness definition was chosen. If such a geometry was chosen, at step 164, the thickness definition is analyzed to determine whether a linear thickness has been defined. If such a selection was not chosen, subroutine 138 ends and the process continues to step 140 (FIG. 19). At step 164, if the thickness definition is not linear, the resulting blade surface will not be ruled, so at step 166, a warning is generated notifying the user that the blade will not be flank millable because of the non-linear thickness definition. After checking whether the thickness is linear, at step 168, the program checks whether the thickness is applied along ruled elements, or geometry QO lines, as described above. If the thickness is not defined along ruled elements, at step 170, a warning is generated notifying the user that the blade will not be flank millable unless the thickness is applied along ruled elements. Subroutine 138 then ends and the process continues to step 140 (FIG. 19). As described above in connection with the Fully radial and 2-D geometries shown in FIG. 6, in alternative embodiments, depending on the specific blade geometry option, at step 168 the program may, instead of warning the user, automatically change the thickness in a post-processing step so the thickness is applied along ruled elements if the difference in the resulting blade geometry is, for example, less than a predetermined value. If such an automatic change is made, the program may notify the user at step 170 that the change was made. For other geometries, such as the "separate blade generating sheet" option (FIG. 6), at step 168, the program may check whether appropriate sub-options, such as sub-options 90 (FIG. 9) are selected in order to determine if the thickness is applied along ruled elements. If the appropriate sub-option is not selected, at step 170 the program can warn the user that the sub-option must be selected to maintain a flank millable geometry. At step 168, if the thickness is defined along ruled elements, subroutine 138 ends and the process continues to step 140 (FIG. 19).

Figure 20:
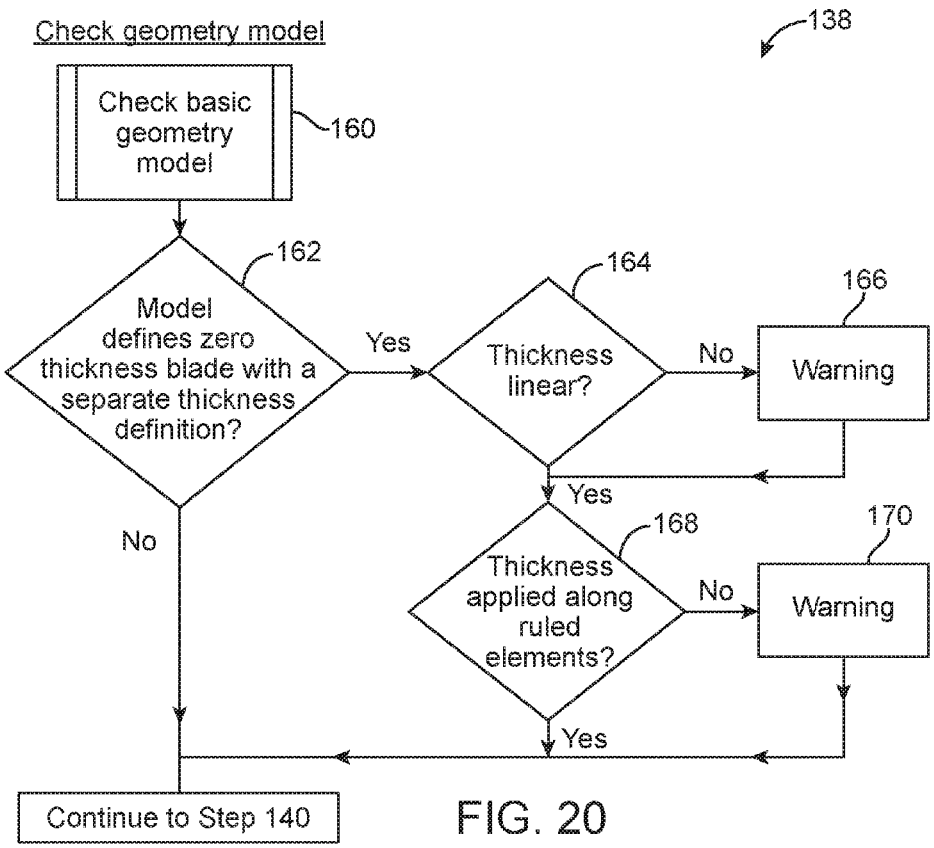
FIG. 20 is a flow diagram for a sub-routine of the method shown in FIG. 19.
Figure 22:
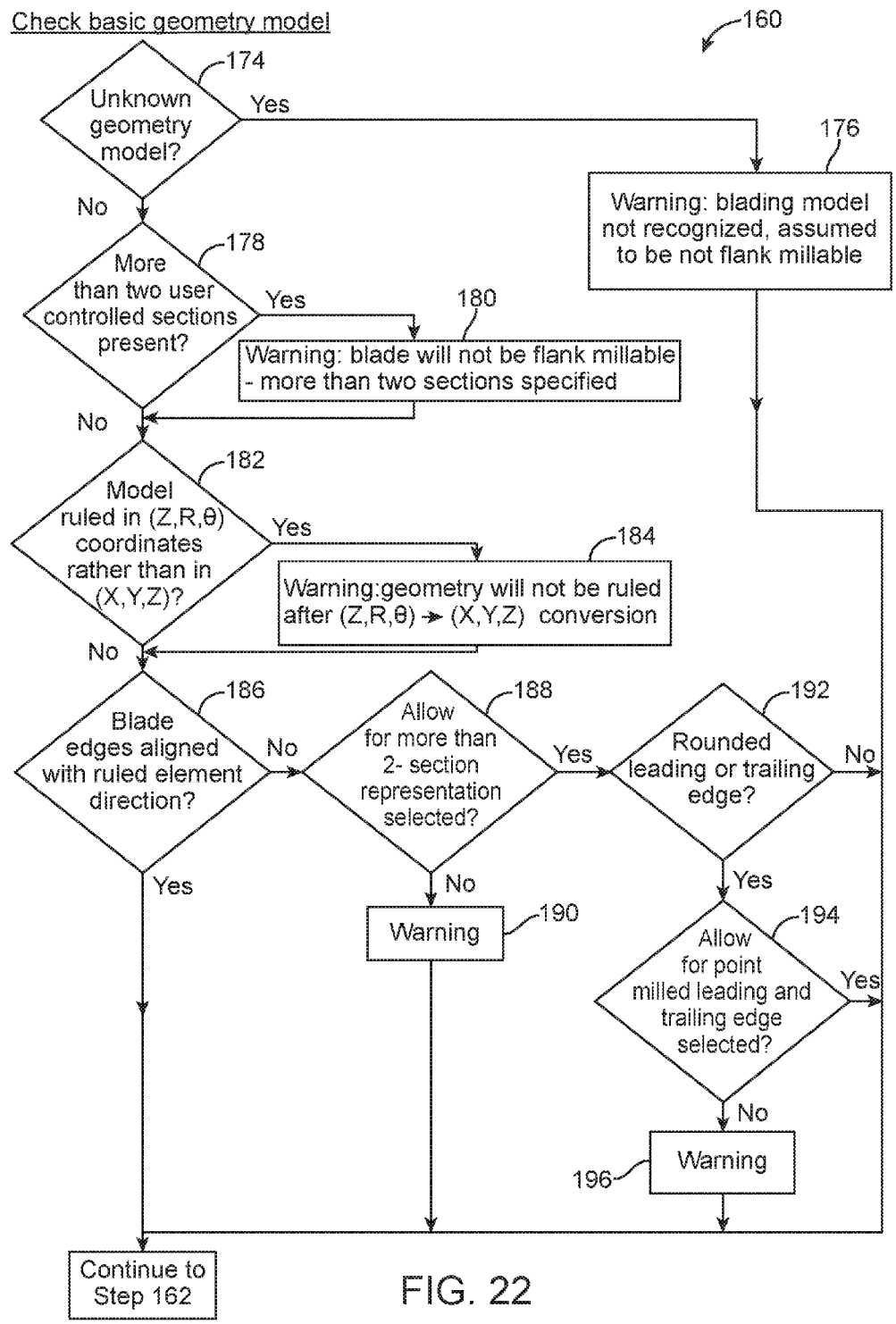
FIG. 22 is a flow diagram for a sub-routine of the method shown in FIG. 19.

FIG. 22 illustrates an exemplary check basic geometry model subroutine 160, which checks for the selection of particular geometry options to determine if any options have been selected that would result in the component not being flank millable. The specific geometry options discussed herein are merely for illustrative purposes, and subroutine 160 may vary according to the component type being designed and the particular geometry options available. In the illustrated embodiment, subroutine 160 checks at step 174 whether an unknown geometry model has been selected and if so, at step 176 warns the user that the blade is assumed to be not flank millable because the geometry is not recognized. If an unknown geometry model is not selected, at step 178 sub-routine 160 checks if the geometry has more than two user controlled sections, and if so, at step 180 warns the user that the program will assume the blade will not be flank millable. If there are not more than two user-controlled sections, at step 182, sub-routine 160 checks if the geometry is ruled in non-Cartesian coordinates and if so, at step 184 warns the user that the blade surface will not be ruled in (x,y,z) space. If the model is ruled in Cartesian coordinates, at step 186, sub-routine 160 checks if the blade edges are aligned with the ruled element direction. If they are so aligned, subroutine 160 ends and the process continues to step 162 (FIG. 20). If not, at step 188, subroutine 160 checks if the appropriate sub-option allowing the blade to be represented by more than two sections, for example sub-option 98 (FIG. 6) is selected. If not, at step 190, the program warns the user that the blade edges make a two-section representation impossible. In an alternative embodiment, the program could suggest that an appropriate sub-option, for example, sub-option 98 (FIG. 6), must be selected. At step 192, the program checks whether the user has specified that the edges not aligned with a ruled element direction are rounded, and if not, subroutine 160 ends and the process continues to step 162 (FIG. 20). If rounded edges are specified, at step 194 the subroutine checks whether the user has selected a sub-option allowing for point milling a leading or trailing edge, such as sub-option 96 (FIG. 6). If the point milling leading and/or trailing edges sub-option is not selected, at step 196, the program warns the user that the edges will require point milling. In an alternative embodiment, the program may also suggest the sub-option be selected to allow the program to consider the blade as otherwise flank millable. If the sub-option is selected, subroutine 160 ends and the process continues to step 162 (FIG. 20). As mentioned above, FIGS. 14 and 16 illustrate an exemplary check geometry model subroutine 138 (FIG. 19), which illustrates how basic geometry selections for a particular set of geometries for a particular type of component (turbomachinery blade) would be performed. In alternative embodiments, the check geometry model subroutine may vary depending on the type of component being designed and the geometry options available in the particular CAD program.

Figure 21:
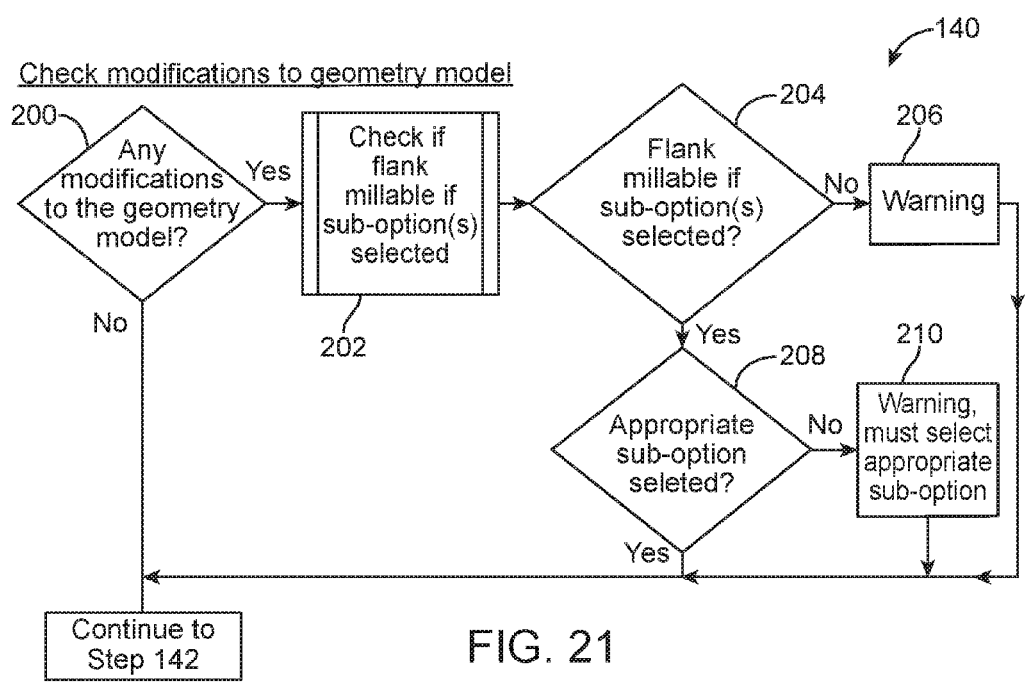
FIG. 21 is a flow diagram for a sub-routine of the method shown in FIG. 19.

Returning to FIG. 19, check modifications to geometry model sub-routine 140 may include a variety of different implementations depending, in part, on the geometry modification options provided by the CAD program. One example of check modifications to geometry model sub-routine 140 is illustrated in FIGS. 21 and 22. As described above, the geometry or shape of a component may be modified in a way that additional sub-options must be selected to maintain the component as, at least partially, flank millable, or to allow the program to consider more complex shapes as flank millable. As shown in FIG. 21, example sub-routine 140 begins at step 200, determining whether a basic geometry model has been modified. If not, subroutine 140 ends and the process continues to step 142 (FIG. 19). If a basic geometry model has been modified, in subroutine 202, the program checks whether the component can be considered flank millable despite the modification, including if one or more required sub-options are selected that, for example, relax the constraints the program uses to determine if the component is flank millable. If, at step 204, it is determined the modification will result in a component that is not considered flank millable, at step 206, the program generates a warning, subroutine 140 ends, and the process continues to step 142 (FIG. 19). If at step 204 it is determined the geometry can still be considered flank millable if certain sub-options are selected, then at step 208, the program determines whether those sub-options have been selected. If such sub-options have been selected, sub-routine 140 ends, and if not, at step 210 the subroutine generates the appropriate warning and then the subroutine ends and the process continues to step 142 (FIG. 19).

Figure 23:
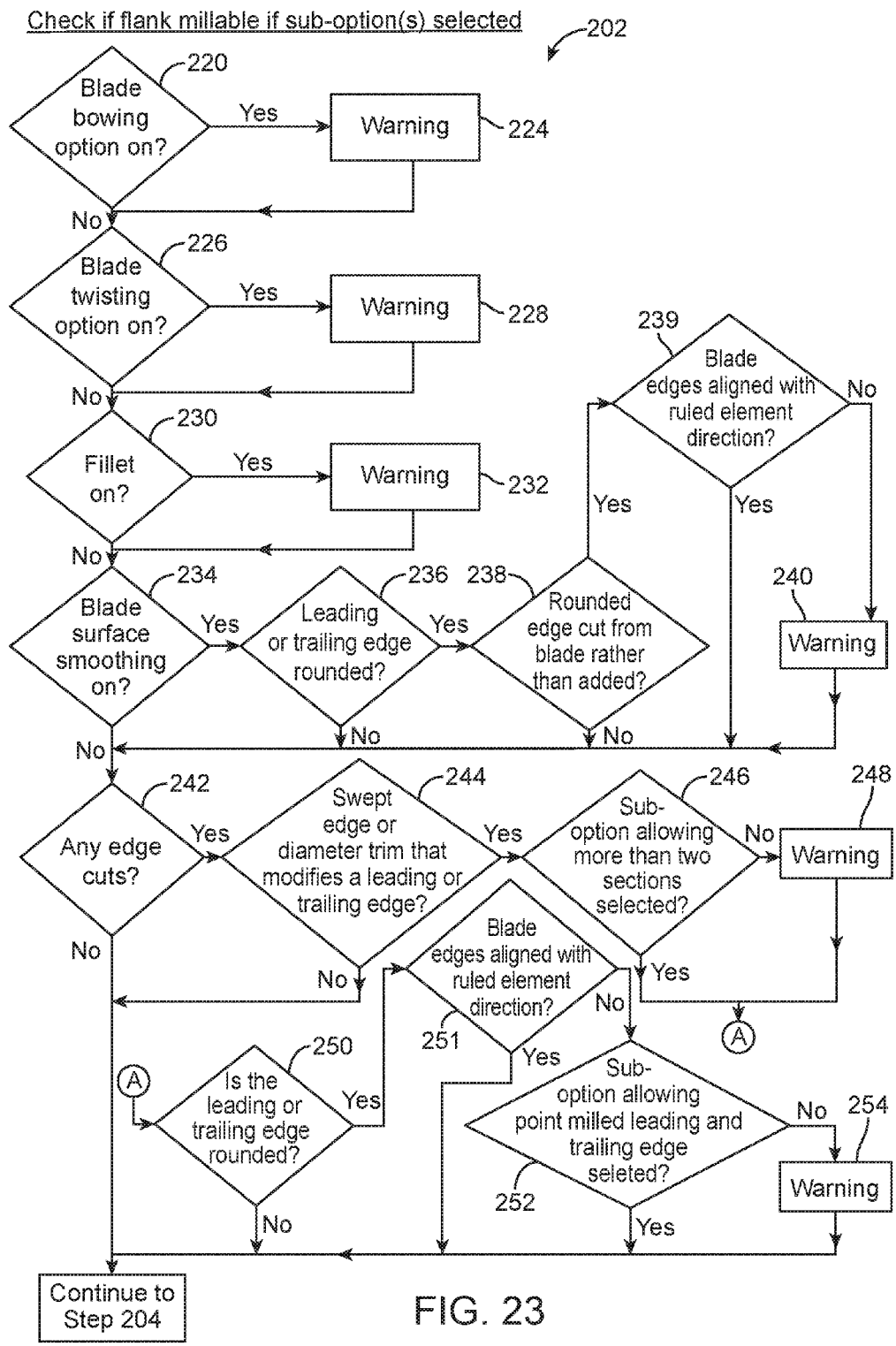
FIG. 23 is a flow diagram for a sub-routine of the method shown in FIG. 19.

FIG. 23 illustrates an exemplary embodiment of "check if flank millable if sub-option(s) selected" subroutine 202 (FIG. 21) applied to a turbomachinery component CAD program. Sub-routine 202 begins at step 220, checking if a blade bowing option has been selected. If so, sub-routine 202 assumes the blade surface is no longer ruled and at step 224 warns the user that selecting the bowing option will result in a component that is not flank millable. Whether or not blade bowing is selected, subroutine 202 continues to step 226, to check whether a blade twisting option has been selected. If so, sub-routine 202 assumes the blade surface is no longer ruled and at step 228 warns the user that selecting the twisting option will result in a component that is not flank millable. Whether or not the blade twisting option was selected, subroutine 202 continues to step 230 to check whether a fillet option has been selected, which, for example, adds a fillet or curved surface to the region where a blade meets the hub of an impeller. If the fillet option is selected, sub-routine 202 assumes the blade surface is no longer ruled and at step 232 warns the user that selecting the twisting option will result in a component that is not flank millable. Whether or not a fillet option was selected, sub-routine 202 continues to step 234 to check whether a blade surface smoothing option has been selected. If so, at step 236 the program checks whether smoothing has been applied to make a rounded leading or trailing edge, and if so, at step 238 determines whether the rounded edge has been cut from the blade or added to the basic blade shape. If the rounded edge was cut from the blade, at step 239, sub-routine 202 checks whether the blade edges are aligned with the blade surface ruled element direction, and if not, assumes the rounding results in a blade surface that is no longer ruled and at step 240 warns the user that selecting the smoothing option will result in a component that is not flank millable. In one embodiment, the subroutine may query if the user wishes to employ one or more of the edge subroutines disclosed herein for modifying a rounded edge shape to make the blade flank millable. After performing the smoothing and rounded edge checks in steps 234-239, subroutine 202 continues to step 242 to check whether any edge cuts have been applied, such as the example edge cuts discussed above in connection with FIG. 12. If so, at step 244 the program checks whether the edge cut results in a swept edge or diameter trim that modifies a leading or trailing edge, and if so, at step 246 the program determines whether a sub-option allowing for the blade to be represented by more than two sections, such as, for example sub-option 98 (FIG. 6) has been selected. If such a sub-option has not been selected, at step 248, a warning is generated that the swept edge or diameter trim makes a two section representation impossible. In an alternative embodiment, the program could also suggest that a sub-option be selected to allow the blade to be represented by more than two sections. At step 244, if the program determines the edge cut results in a swept edge or diameter trim that modifies a leading or trailing edge, at step 246 the program checks whether the sub-option allowing more than two sections has been selected and if so, at step 250, the program also checks whether the modified leading or trailing edge is rounded. If so, at step 251 the program checks whether the edges are aligned with the ruled element direction, and if not, at step 252 checks whether a sub-option allowing for point milling, such as example sub-option 96 (FIG. 6) has been selected. If not, at step 254, a warning is generated that the rounded edge cut will require point milling. In one embodiment, the subroutine may also query if the user wishes to employ one or more of the edge subroutines disclosed herein for modifying a rounded edge shape to make the blade flank millable. In alternative embodiments, the program could also suggest that a sub-option allowing for point milling a portion of the blade be selected to allow the program to consider the remainder of the blade as flank millable. After performing the edge rounding checks of steps 250 and 252, the subroutine ends and the process continues to step 204 (FIG. 21).

In the example sub-routine 202 shown in FIG. 23, for many potential blade modification options, such as bowing, twisting, fillets, and surface smoothing, the example sub-routine assumes the blade is not flank millable if the particular options are selected. In alternative embodiments, the program could perform additional checks and provide additional sub-options that would allow the blade to be, at least in part, flank millable despite the modification. For example, if a fillet is applied, instead of assuming the fillet results in a blade that is not flank millable, the sub-routine could allow the fillet portion of the blade to be represented by separate sections and, for example, point milled. Similar additions could be made for other geometry options to allow for more complex surfaces to be represented separately and maintain a portion of the blade as flank millable.

Figure 24:
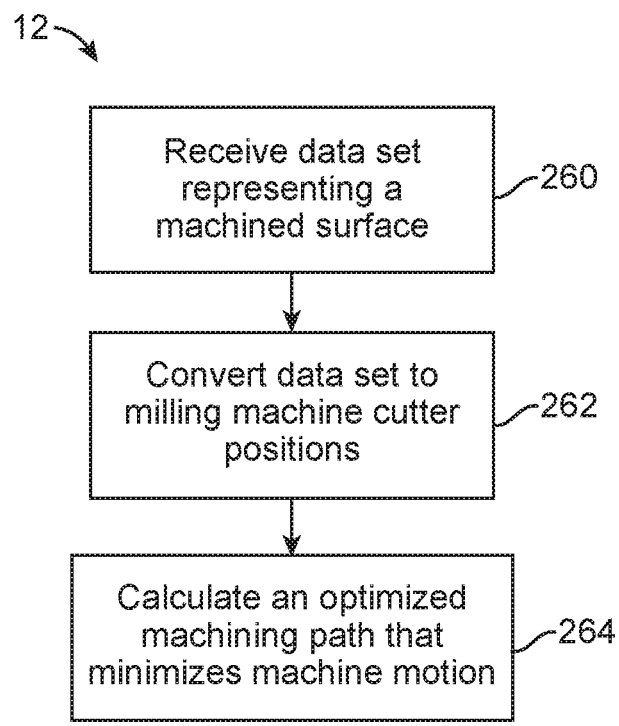
FIG. 24 is a flow diagram illustrating a method of calculating milling machine instructions for flank milling a part.

Returning to FIG. 1, after step 10, where a flank millable component is designed, at step 12, milling machine instructions are calculated for milling the part. FIG. 24 illustrates step 12 in further detail. As shown in FIG. 24, step 12 involves a first step 260, where a data set representing the shape of a flank millable component is received. At step 262, the data set is converted into a series of cutter positions, such as positions of cutter 28 of 5-axis milling machine 20 (FIG. 2).

Figure 25:
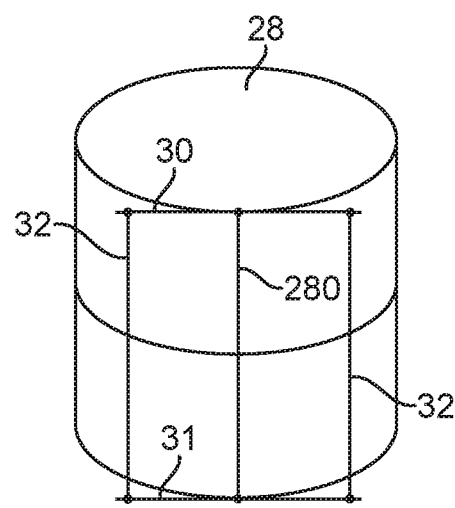
FIG. 25 is a perspective view of an initial position of a milling machine rotary cutter.
Figure 26:
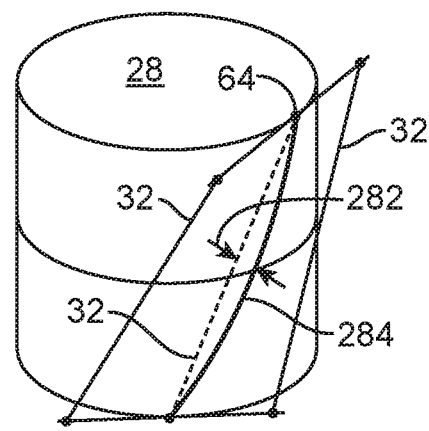
FIG. 26 is a perspective view of the cutter of FIG. 25, and also showing an amount of undercut.
Figure 27:
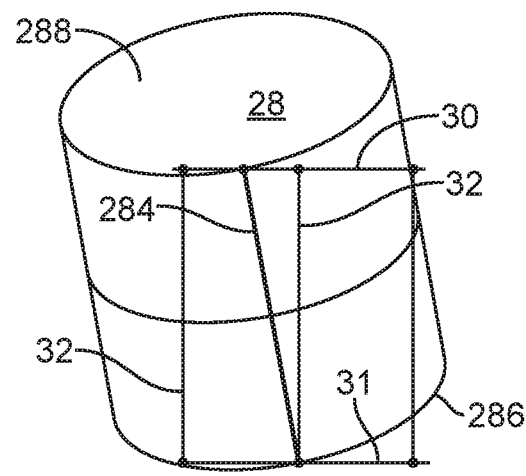
FIG. 27 is a perspective view of the cutter of FIG. 25 in an alternative orientation.

Referring again to FIG. 2, as described above, component 22 is an exemplary impeller, having a plurality of blades 25 that have ruled surfaces 29 defined by guide curves 30 and 31 connected by straight lines or rulings 32. FIG. 25 illustrates the initial position of cutter 28 (also shown in FIG. 2) determined in step 262 (FIG. 24). The position shown in FIG. 25 is the "pure" geometric solution for flank milling of ruled surfaces, where cutter 28 is located tangent to ruled surface guide curves 30, 31 at the junctions of the rulings 32. The tangency between cutter 28 and the ruled surface is shown by line 280 (FIG. 25), which is coincident with a ruling 32. As discussed below, this orientation can be referred to as an isoparametric-tangency orientation. The isoparametric-tangency orientation, however, can result in inaccurate machining results when the surface of the component being machined is curved or twisted. As shown in FIG. 26, when machining certain non-planar surfaces, cutter 28 can remove too much material, resulting in an undercut 282 represented by the difference between the desired surface at ruling 32 and the actual path of the cutter, represented by line 284. Undercut 282 can, however, be minimized by re-orienting the cutter from an isoparametric-tangency orientation to a non-isoparametric tangency orientation. An exemplary non-isoparametric tangency orientation is shown in FIG. 27, where bottom portion 286 of cutter 28 is kept at the location where a ruling 32 intersects guide curve 31, and top portion 288 of the cutter is moved along guide curve 30 to contact point 28, such that the contact curve between the cutter and the resulting surface represented by line 284 most closely matches ruled surface 29 and undercut 282 (FIG. 26) is minimized. In alternative embodiments, top portion 288 could remain fixed and bottom portion 286 could be moved along guide curve 30, or both ends of cutter 28 could be adjusted. Also, a reference point other than the guide curves could be used for the adjustment.

Thus, an undercut-minimized cutter orientation can be calculated for every point along a surface by finding a deviation from the isoparametric-tangency orientation at each location. An undercut-minimized solution, however, is often not desirable because it can result in unacceptable milling machine motion. For example, the rotary motion of milling machine head 26 (FIG. 2) can be unsmooth, and there can be wild swings in work piece table 24 rotary motion, approaching 180° from one instruction to the next, even when there is only a slight change in cutter orientation. Thus, a more optimized machining instruction is needed that results in a within-tolerance undercut while also providing smooth milling machine motion. Such an optimized set of instructions is determined at step 264 (FIG. 28).

Figure 28:
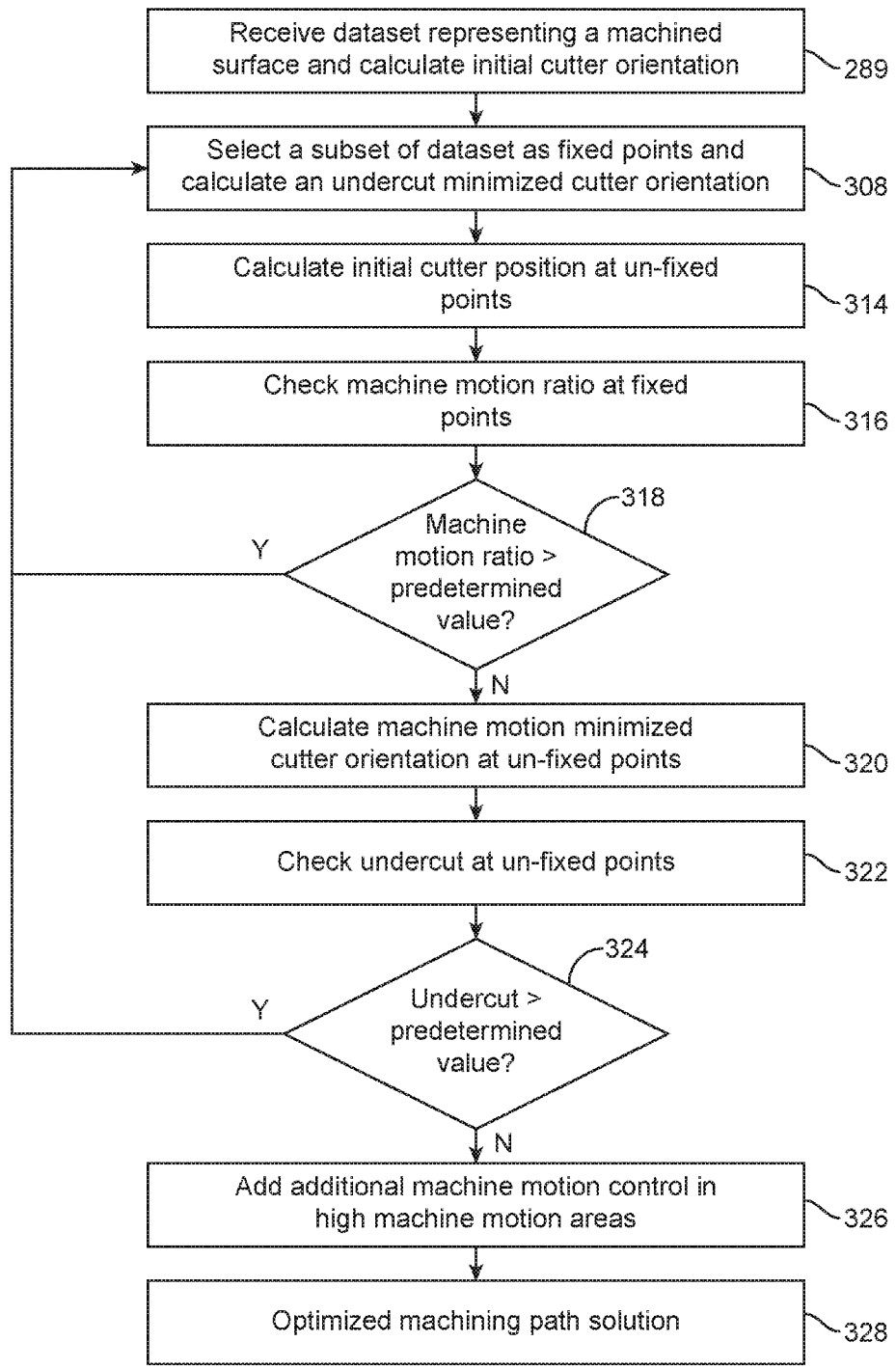
FIG. 28 is a flow diagram illustrating a method of calculating milling machine instructions for flank milling a part.
Figure 29:
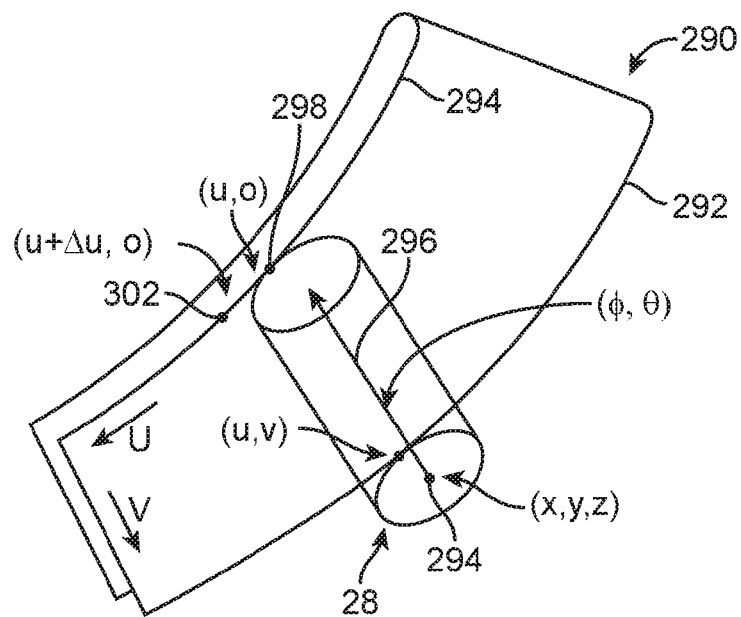
FIG. 29 is a perspective view of a cutter and a turbomachinery blade surface.
Figure 30:
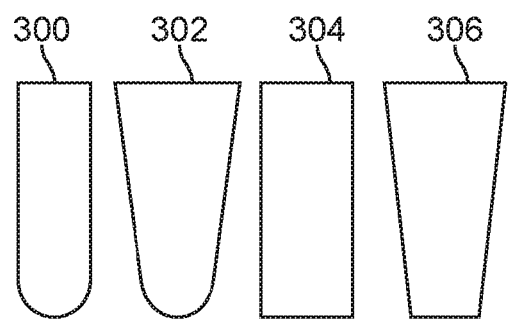
FIG. 30 is side views of exemplary types of milling machine cutters.

FIG. 28 illustrates an exemplary process for calculating machine instructions for flank milling a work piece that results in within tolerance undercut while also minimizing machine motion, resulting in smooth machine motion and reduced machining time. At step 289, a dataset representing a machined surface is received and an initial cutter orientation is calculated. FIG. 29 illustrates an exemplary coordinate system that may be utilized to calculate an optimized machine path. At step 289 a two parameter data set S(u,v) representing a machined surface 290 (FIG. 29) of a component, is received. As shown in FIG. 29, surface 290 can be represented by isoparametric guide curves 292 and 294, defined as u-curves with a constant v value. The orientation of cutter 28 can be defined by the (x,y,z) location of cutter tip center 294, which is offset from point (u,v) by the cutter tip radius, and cutter orientation vector 296 defined in (φ,Θ) spherical coordinates, with the cutter orientation vector being directly related to the rotational axes of milling machine 20. FIG. 29 illustrates cutter 28 in an isoparametric tangency orientation with the cutter orientation vector 296 aligned with an isoparametric ruling along a constant u curve, indicated by cutter contact point 298 at (u,0). To determine the initial cutter orientation at step 289 (FIG. 28), the program calculating the machining instructions also receives information on the size and shape of the cutter 28. FIG. 30 illustrates exemplary cutter shapes that may be used with a milling machine such as milling machine 20, with possible cutter shapes including cylindrical with a ball end 300, conical with a ball end 302, cylindrical with a flat end 304, and conical with a flat end 306. The shape and radius of the cutter is used to calculate the offset of cutter tip center 294 from point (u,v) (FIG. 29), and cutter orientation vector 296.

Figure 31:
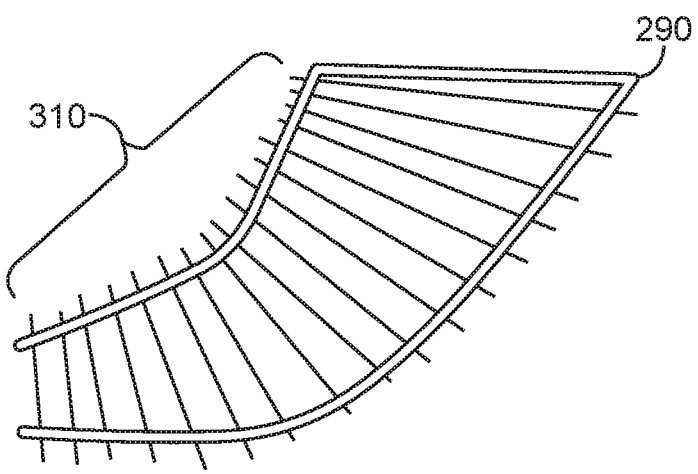
FIG. 31 is an illustration of cutter positions along a machine path.
Figure 32:
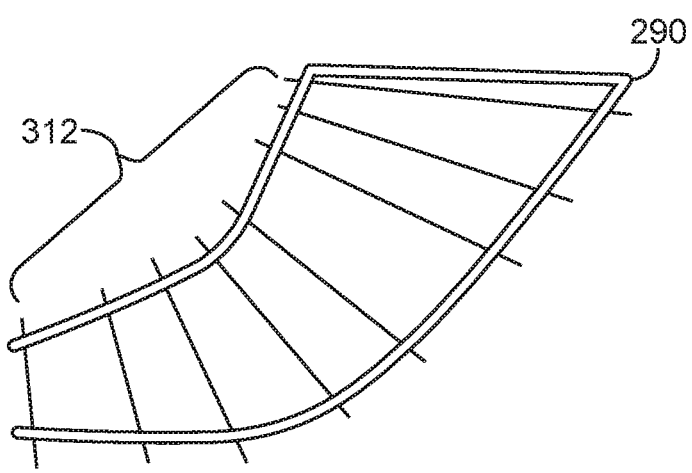
FIG. 32 is an illustration of a subset of the cutter positions in FIG. 31.

With an initial cutter orientation determined, at step 308, a subset of points along surface 290 are selected as fixed points and an undercut-minimized cutter orientation is calculated at each of those points. FIGS. 31 and 32 provide a conceptual illustration of this step, where lines 310 (FIG. 31) represent all of the machining positions for surface 290 and lines 312 (FIG. 32) are a subset of fixed points, representing a subset of positions 310, where an undercut-minimized cutter orientation is determined. As described above, an undercut-minimized orientation can be determined by altering the angle of the cutter 28 with respect to the surface 290 (FIG. 29). In the illustrated embodiment, the undercut-minimized orientation is determined by maintaining cutter tip 294 at point (u,v), and varying the contact point of cutter 28 along isoparametric guide curve 294 from point 298 at (u,0) to a point (u+/−Δu, 0) 302 (FIG. 29). At step 314, an initial cutter orientation is calculated for the remaining points, or unfixed points by linearly interpolating from the fixed points 312 undercut-minimized orientations. At step 316 a machine motion ratio is checked for each of fixed points 312 to determine whether any of the undercut-minimized orientations will result in excessive machine motion. It has been determined, for example, that near-vertical cutter orientations can result in large machine motion. In an example embodiment, the machine motion ratio is defined by the following equation:

$$\text{Machine Motion Ratio} = \frac{\text{distance the tool tip travels relative to the machine}}{\text{distance the tool travels relative to the workpiece}} \quad \text{Eq. (1)}$$

At step 318, if the machine motion ratio for any of the fixed point undercut-minimized orientations is greater than a predetermined value, then that point is unfixed and assigned an initial linearly-interpolated orientation at step 314. The predetermined value can be any number, and can be a user defined parameter. In an example embodiment, the predetermined value can be set to 2 such that if the machine motion ratio for any fixed point is greater than 2, that point will be removed from the subset of fixed points.

At step 320, an optimized cutter orientation is determined for each of the unfixed points. U.S. Pat. No. 5,391,024 entitled "Method for Multi-Criteria Flank Milling of Ruled Surfaces," which is incorporated by reference herein in its entirety, describes earlier approaches to determining a machining path that sought to calculate machining instructions resulting in within-tolerance undercut while minimizing machine motion. Approaches described in U.S. Pat. No. 5,391,024 include separately interpolating cutter orientation vector Φ values and Θ values, and then using a empirically based scoring system to select one of the two solutions. While those earlier approaches resulted in improved machining instructions relative to calculating an undercut-minimized machine path, they still resulted in unsmooth machine motion for certain shapes. At step 320, an improved calculation is utilized that determines an optimized machining path by simultaneously minimizing machine motion in both the Φ and Θ directions. In an example embodiment, the optimization calculation is defined by the following objective function:

$$S = \sum_{i=3}^{n} (\Delta^2 \varphi_i)^2 + (\Delta^2 \theta_i)^2 \quad \text{Eq. (2)}$$

where $$\Delta^2 \varphi_i = \Delta \varphi_i - \Delta \varphi_{i-1} \quad \text{Eq. (3)}$$

$$\Delta \varphi_i = \frac{\varphi_i - \varphi_{i-1}}{d_i - d_{i-1}} \quad \text{Eq. (4)}$$

$$\Delta^2 \theta_i = \Delta \theta_i - \Delta \theta_{i-1} \quad \text{Eq. (5)}$$

$$\Delta \theta_i = \frac{\theta_i - \theta_{i-1}}{d_i - d_{i-1}} \quad \text{Eq. (6)}$$

$$\varphi_i(\Delta u_i) = \varphi_{io} + \frac{d\varphi_i}{d_u} \Delta u_i \quad \text{Eq. (7)}$$

$$\theta_i(\Delta u_i) = \theta_{io} + \frac{d\theta_i}{d_u} \Delta u_i \quad \text{Eq. (8)}$$

$\Delta \varphi_i$=first finite difference
$\Delta^2 \varphi_i$=second finite difference
$\varphi_i$=machine axis value φ at point i $\Theta_i$=machine axis value $\Theta$ at point i
$d_i$=distance along machining path at point i As shown in equation (2), the objective function S is defined as the sum of the squares of the second finite differences of the phi and theta machining axes with $\Delta u_i$ as the independent variable. The objective function is minimized using standard mathematical techniques to find values of $\Delta u$. This is done by expanding the terms of the objective function, setting $\partial S/\partial \Delta u_i=0$, and solving the resulting system of 5-banded linear equations. New values of phi and theta are then calculated. The optimizer is called iteratively due to the linear approximation of $\varphi_i(\Delta u_i)$ and $\theta_i(\Delta u_i)$, and stops when the change in the value of the objective function between subsequent calculations is less than a predetermined value. As shown in equations 5 and 6, a backward differencing scheme is utilized in the present embodiment. In alternative formulations, a central or forward differencing scheme could also be utilized.

The result of the machine-motion minimized calculation at step 320, where an objective function, such as objective function S (Eq. 2) is minimized, is an optimized cutter path where machine motion in both the $\Phi$ and $\Theta$ directions is simultaneously minimized. The optimized cutter path is reflected in new cutter orientation $\Delta u$ values (FIG. 29) for each of the unfixed points. Because the objective function S (Eq. 2) does not consider undercut, at step 322, the undercut is checked at each of the unfixed points. At step 324, if the undercut at any of the unfixed points is greater than a predetermined value, then those points are added to the subset of fixed points (step 308) where an undercut-minimized orientation is assigned. The process is then repeated for the remaining unfixed points to determine machine-motion minimized orientations. The predetermined value used at step 324 can be a user defined parameter and can vary depending on the acceptable tolerances for the component being machined, with a lower predetermined value being set for parts having tighter tolerances.

In some embodiments, at step 326, additional machine motion control can be added to one or more locations. For example, for some surfaces, the $\Phi$ and/or $\Theta$ curves calculated by the minimized objective function can have a high rate of change in certain areas, such as endpoints of the cutter path. For those cases, the first finite differences of $\Phi$ and $\Theta$ can be added to the objective function S in regions of high motion which will result in a flatter optimized $\Delta u$ graph in those regions. In addition, in some exemplary embodiments, a user may specify the $\Delta u$ values for one or more locations to manually set the orientation to either minimize machine motion or undercut, or both. At step 328, an optimized set of machining instructions is generated.

Figure 33:
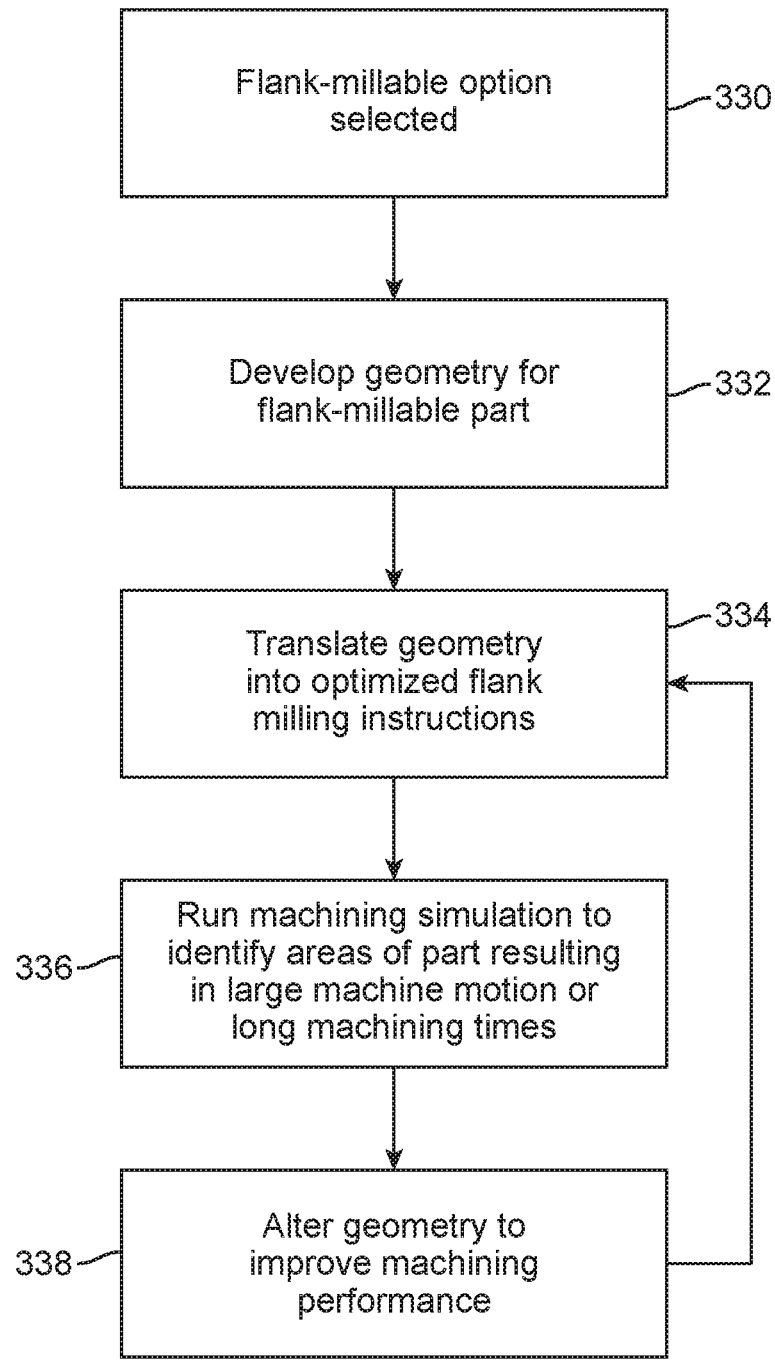
FIG. 33 is a flow diagram illustrating a method of designing a flank millable component with improved manufacturability.

FIG. 33 illustrates a design process for designing a flank millable component with improved manufacturability. At step 330, a designer utilizing a CAD program may select a flank millable option, such as the flank millable options disclosed herein, to ensure the final component design is flank millable. At step 332, an initial flank millable geometry is determined. At step 334, the CAD program includes functionality to translate the geometry into optimized machine instructions, using for example, the methods disclosed herein for determining machine instructions that result in within-tolerance undercut while minimizing machine motion. At step 336, the CAD program can perform a machining simulation to assess the machinability of the component and determine, for example, locations of the component that will be difficult to machine or result in excessive machining time. At step 338, armed with this information, the designer may alter the component geometry and then re-perform steps 334 and 336 until an optimized component geometry is determined.

It is to be noted that any one or more of the aspects and embodiments described herein may be conveniently implemented using one or more machines (e.g., one or more computing devices that are utilized as a user computing device for an electronic document, one or more server devices, such as a document server) programmed according to the teachings of the present specification and appropriate software coding can readily be prepared by skilled programmers based on the teachings of the present disclosure. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 34:
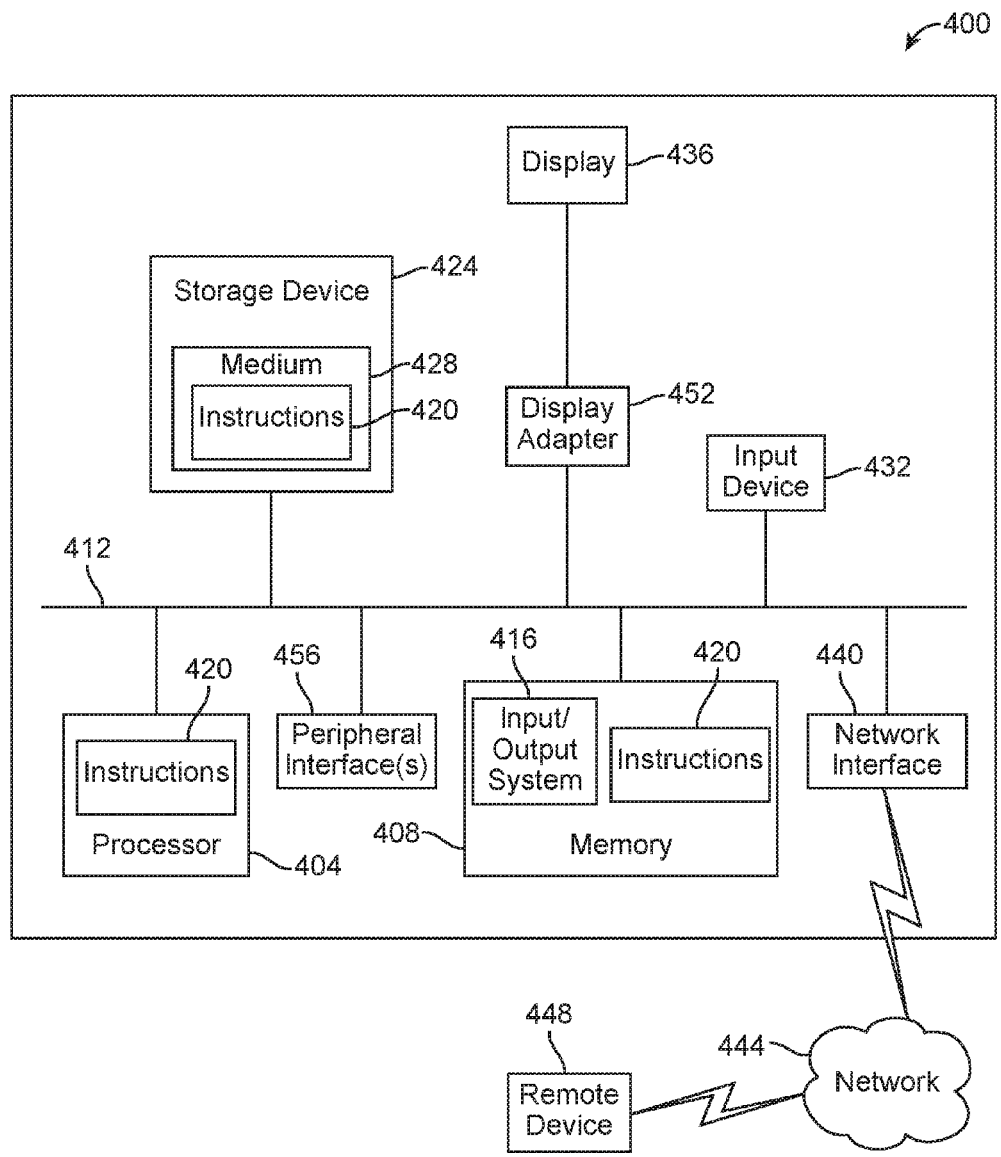
FIG. 34 is a diagram illustrating a machine capable of implementing various aspects of the present disclosure.

FIG. 34 shows a diagrammatic representation of one embodiment of a computing device in the exemplary form of a computer system 400 within which a set of instructions for performing the methods disclosed herein. It is also contemplated that multiple computing devices may be utilized to implement a specially configured set of instructions for causing the device to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1294 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440 may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide a graphical representation. In addition to a display device, a computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of flank milling a turbomachinery component, comprising:
   receiving machining instructions for a turbomachinery component geometry, the geometry including:
      first and second blade surfaces each extending in a spanwise direction between a hub section and a shroud section and extending in a flowwise direction between a first and second end, the first and second blade surfaces defined by a plurality of blade surface geometry quasi-orthogonal (QO) lines; and
      a rounded edge located at one of the first and second ends and extending in a flowwise direction from a first edge transition line to a second edge transition line;
   modifying the turbomachinery component geometry by modifying a shape of the rounded edge so that the first edge transition line is adjacent to and substantially aligned with one of the first blade surface QO lines and the second edge transition line is adjacent to and substantially aligned with one of the second blade surface QO lines; and machining the first blade surface, second blade surface, and rounded edge with a continuous flank milling operation, the continuous flank milling operation including machining a full span of the turbomachinery component extending from the hub section to the shroud section of the first blade surface, second blade surface, and rounded edge in a single pass of a flank milling cutter around the turbomachinery component.

2. A method according to claim 1, wherein the first and second blade surfaces and the rounded edge are ruled surfaces.

3. A method according to claim 1, wherein the rounded edge has an elliptical shape having major and minor axes and an ellipse ratio equal to a ratio of the major and minor axes, wherein the ellipse ratio varies along the rounded edge.

4. A method according to claim 1, wherein a length-to-width ratio of the rounded edge varies along the length of the edge.

5. A method according to claim 1, wherein the method further includes:
identifying one or more blade surface QO lines having an orientation that is likely to cause increased or unsmooth motion of a flank milling cutter and machine tool; and
adjusting an orientation of the one or more of the blade surface QO lines to reduce or smooth the motion of the flank milling cutter and machine tool.

6. A method according to claim 5, wherein said adjusting an orientation of one or more of the blade surface QO lines includes selecting blade surface QO line orientations that result in an estimated flank milling cutter speed along the hub section that is approximately the same as an estimated flank milling cutter speed along the shroud section.

7. A method according to claim 1, wherein the method further includes adjusting a shape of the rounded edge at at least one of the hub and shroud sections to modify a natural frequency of the blade while maintaining the first and second edge transition lines in alignment with the first and second blade surface ends.

8. A method of flank milling a turbomachinery component, comprising:
receiving machining instructions for a turbomachinery component geometry, the geometry including:
first and second blade surfaces defined by a plurality of blade surface geometry quasi-orthogonal (QO) lines; and
a rounded leading or trailing edge extending from a first edge transition line to a second edge transition line, wherein a shape of the rounded edge was modified so that the first edge transition line is adjacent to and substantially aligned with one of the first blade surface QO lines and the second edge transition line is adjacent to and substantially aligned with one of the second blade surface QO lines; and
machining the first blade surface, second blade surface, and rounded edge with a continuous flank milling operation, wherein the machining includes selecting a cutter with a length sufficient to flank mill an entire span of the first or second blade surfaces in one machining pass of the cutter around the turbomachinery component.

9. A method according to claim 8, wherein the blade surface geometry QO lines are straight lines in three-dimensional space.

10. A method according to claim 8, wherein the continuous flank milling operation includes at least one continuous flank milling machine tool pass around the turbomachinery component that machines the entire span of the first and second blade surfaces and rounded edge along an entire flowwise length of the first and second blade surfaces and rounded edge.

11. A turbomachinery component, comprising:
at least one blade having a pressure surface, a suction surface, and leading and trailing edges, each extending between a hub side and shroud side of the blade, wherein the pressure and suction surfaces are ruled surfaces that can be defined by geometry quasi-orthogonal (QO) lines, the QO lines being straight lines in three-dimensional space, each of the QO lines extending between the hub and shroud sides, further wherein at least one of the leading and trailing edges have a rounded shape that can be defined as extending in a flowwise direction from a first edge transition line to a second edge transition line, wherein a design geometry of at least one of the leading and trailing edges was modified so that the first edge transition line is aligned with one of the blade surface QO lines and the second edge transition line is aligned with another one of the blade surface QO lines;
wherein the at least one blade was machined, at least in part, with a continuous flank milling operation that included at least one continuous flank milling cutter pass in which an entire span of the at least one blade extending from the hub side to the shroud side along the pressure surface, suction surface, and leading and trailing edges was machined in a single pass around the blade.

12. A method of flank milling a turbomachinery component, comprising:
receiving machining instructions for a turbomachinery component geometry, the geometry including:
first and second blade surfaces each extending in a spanwise direction between a hub section and a shroud section and that include a plurality of blade surface geometry quasi-orthogonal (QO) lines extending between the hub and shroud sections; and
a rounded leading or trailing edge extending from a first edge transition line adjacent to and substantially aligned with one of the first blade surface QO lines to a second edge transition line adjacent to and substantially aligned with one of the second blade surface QO lines;
identifying one or more blade surface QO lines having an orientation that will cause increased or unsmooth motion of a flank milling cutter;
adjusting the orientation of the one or more blade surface QO lines so that an estimated flank milling cutter speed along the hub section is approximately the same as an estimated flank milling cutter speed along the shroud section; and
machining the turbomachinery component with a flank milling operation.

* * * * *